(12) United States Patent
Wang et al.

(10) Patent No.: US 11,456,292 B2
(45) Date of Patent: Sep. 27, 2022

(54) SEMICONDUCTOR DEVICE AND MANUFACTURING METHOD THEREOF

(71) Applicants: TAIWAN SEMICONDUCTOR MANUFACTURING CO., LTD., Hsinchu (TW); TSMC Nanjing Company Limited, Nanjing (CN); TSMC China Company Limited, Shanghai (CN)

(72) Inventors: Xin-Yong Wang, Shanghai (CN); Yang Zhou, Nanjing (CN); Liu Han, Nanjing (CN)

(73) Assignees: TAIWAN SEMICONDUCTOR MANUFACTURING CO., LTD., Hsinchu (TW); TSMC NANJING COMPANY LIMITED, Nanjing (CN); TSMC CHINA COMPANY LIMITED, Shanghai (CN)

(*) Notice: Subject to any disclaimer, the term of this patent is extended or adjusted under 35 U.S.C. 154(b) by 0 days.

(21) Appl. No.: 16/871,499

(22) Filed: May 11, 2020

(65) Prior Publication Data

US 2021/0320098 A1 Oct. 14, 2021

(30) Foreign Application Priority Data

Apr. 9, 2020 (CN) .......................... 202010272941.6

(51) Int. Cl.

| H01L 21/768 | (2006.01) |
|---|---|
| H01L 27/02 | (2006.01) |
| G06F 30/392 | (2020.01) |
| H01L 21/28 | (2006.01) |
| H01L 21/8238 | (2006.01) |

(Continued)

(52) U.S. Cl.
CPC ........ *H01L 27/0207* (2013.01); *G06F 30/392* (2020.01); *H01L 21/28123* (2013.01); *H01L 21/823814* (2013.01); *H01L 21/823821* (2013.01); *H01L 21/823828* (2013.01); *H01L 27/0924* (2013.01); *H01L 29/0653* (2013.01);

(Continued)

(58) Field of Classification Search
None
See application file for complete search history.

(56) References Cited

U.S. PATENT DOCUMENTS

| 8,962,400 B2 | 2/2015 | Tsai et al. |
|---|---|---|
| 9,093,514 B2 | 7/2015 | Tsai et al. |

(Continued)

FOREIGN PATENT DOCUMENTS

| TW | 201909420 A | 3/2019 |
|---|---|---|
| TW | 201926433 A | 7/2019 |

*Primary Examiner* — Joseph C. Nicely
*Assistant Examiner* — Lamont B Koo
(74) *Attorney, Agent, or Firm* — Birch, Stewart, Kolasch & Birch, LLP

(57) ABSTRACT

A semiconductor device includes a substrate, a first gate structure, a second gate structure, a third gate structure, and a first source/drain region. The first, second, and third gate structures are above the substrate and arranged in a first direction. The first, second, and third gate structures extend in a second direction different from the first direction, and the second gate structure is between the first and third gate structures. The first source/drain region is between the first and third gate structures, and the first source/drain region is at one end of the second gate structure.

20 Claims, 38 Drawing Sheets

(51) Int. Cl.
*H01L 27/092* (2006.01)
*H01L 29/06* (2006.01)
*H01L 29/08* (2006.01)
*H01L 29/66* (2006.01)
*G06F 119/18* (2020.01)

(52) U.S. Cl.
CPC .... *H01L 29/0847* (2013.01); *H01L 29/66545* (2013.01); *G06F 2119/18* (2020.01)

(56) References Cited

U.S. PATENT DOCUMENTS

| | | | |
|---|---|---|---|
| 9,236,267 B2 | 1/2016 | De et al. | |
| 9,245,805 B2 | 1/2016 | Yeh et al. | |
| 9,418,897 B1 | 8/2016 | Ching et al. | |
| 9,520,482 B1 | 12/2016 | Chang et al. | |
| 9,576,814 B2 | 2/2017 | Wu et al. | |
| 9,608,116 B2 | 3/2017 | Ching et al. | |
| 9,812,363 B1 | 11/2017 | Liao et al. | |
| 9,859,380 B2 | 1/2018 | Lee et al. | |
| 2017/0338229 A1* | 11/2017 | Oh | H01L 29/66674 |
| 2017/0372906 A1* | 12/2017 | Jang | H01L 21/823431 |
| 2018/0315854 A1* | 11/2018 | Liaw | H01L 29/0653 |
| 2019/0326395 A1* | 10/2019 | Ando | H01L 29/0673 |
| 2020/0168607 A1* | 5/2020 | Yang | H01L 29/78696 |
| 2021/0305420 A1* | 9/2021 | Frougier | H01L 29/785 |

\* cited by examiner

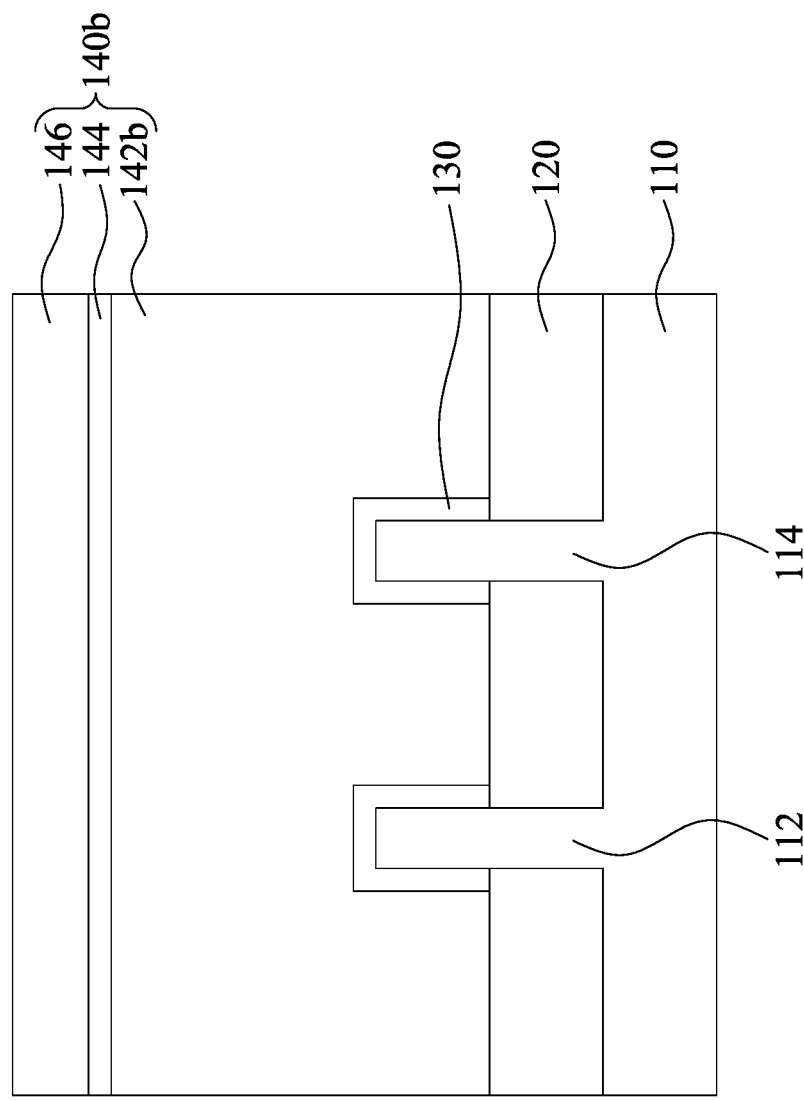

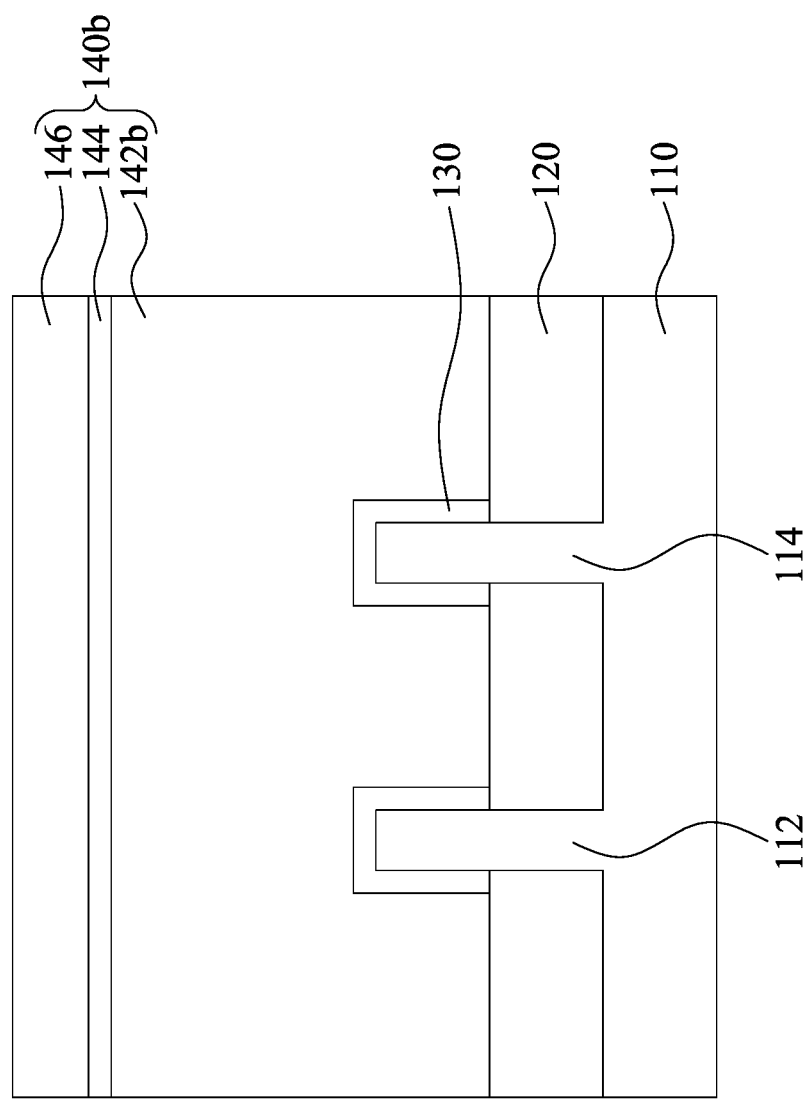

US 11,456,292 B2

SEMICONDUCTOR DEVICE AND MANUFACTURING METHOD THEREOF

PRIORITY CLAIM AND CROSS-REFERENCE

The present application claims priority to China Application Serial Number 202010272941.6, filed Apr. 9, 2020, which is herein incorporated by reference.

BACKGROUND

Integrated circuits (ICs) are often designed to implement various devices, including, for example, transistors, resistors, capacitors, or the like. These devices are often designed using connections of conductive traces to form circuits. Increasingly dense ICs result in benefits in terms of speed, functionality and cost, but cause increasingly difficult design and fabrication issues.

BRIEF DESCRIPTION OF THE DRAWINGS

Aspects of the present disclosure are best understood from the following detailed description when read with the accompanying figures. It is noted that, in accordance with the standard practice in the industry, various features are not drawn to scale. In fact, the dimensions of the various features may be arbitrarily increased or reduced for clarity of discussion.

DETAILED DESCRIPTION

Figure 1A:
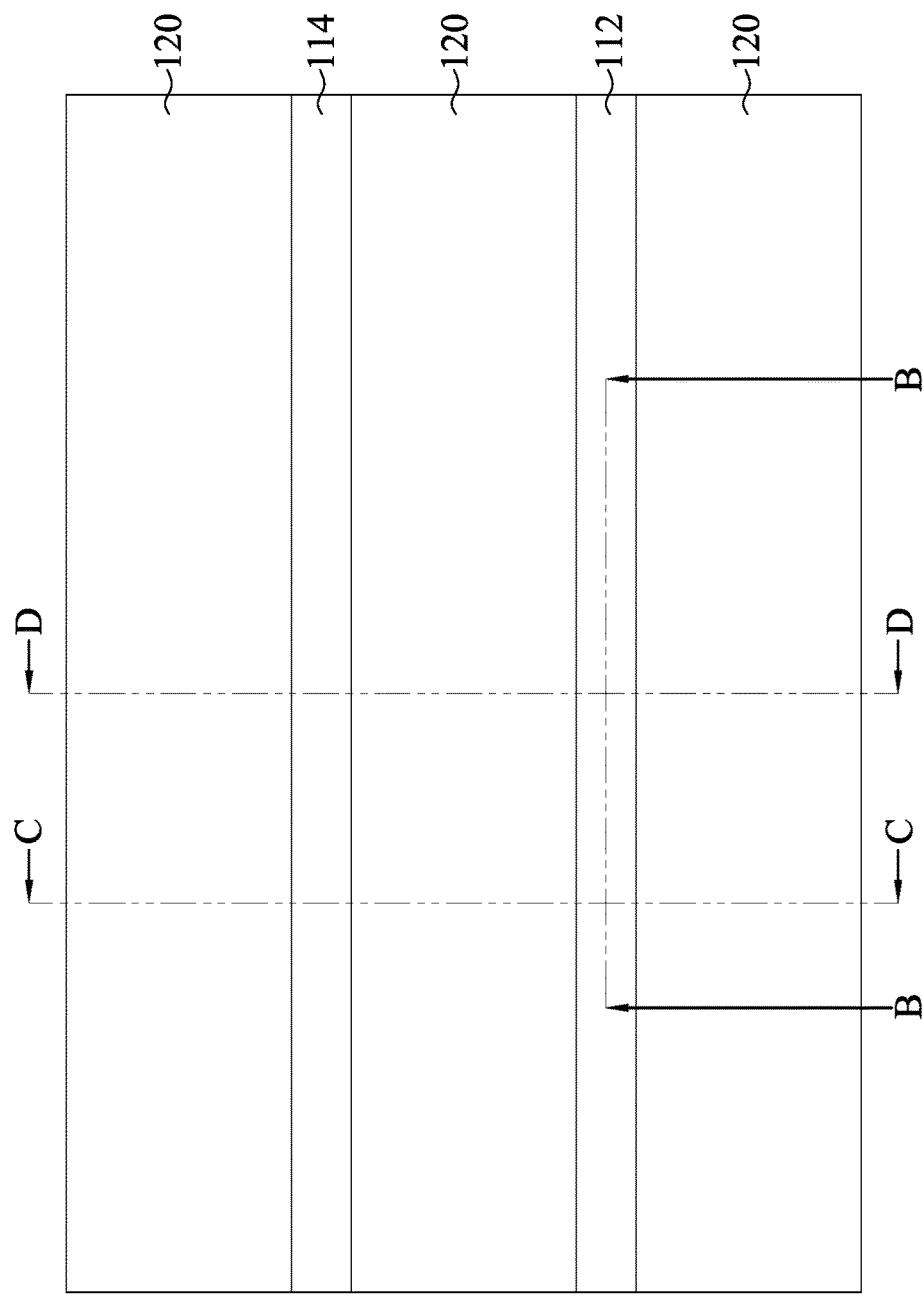
FIGS. 1A to 6D illustrate a method in various stages of manufacturing a semiconductor device in accordance with some embodiments of the present disclosure.
Figure 1B:
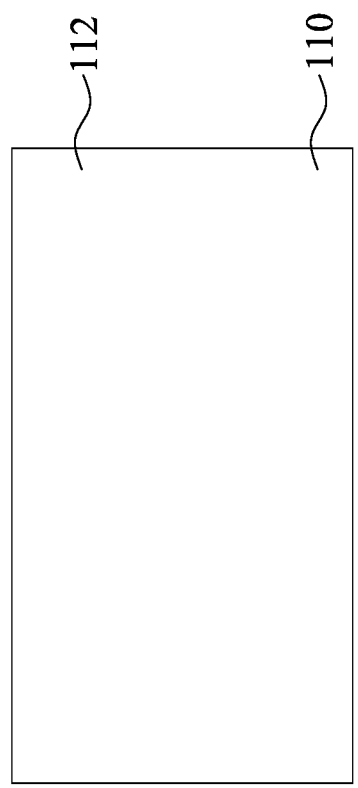
Figure 1C:
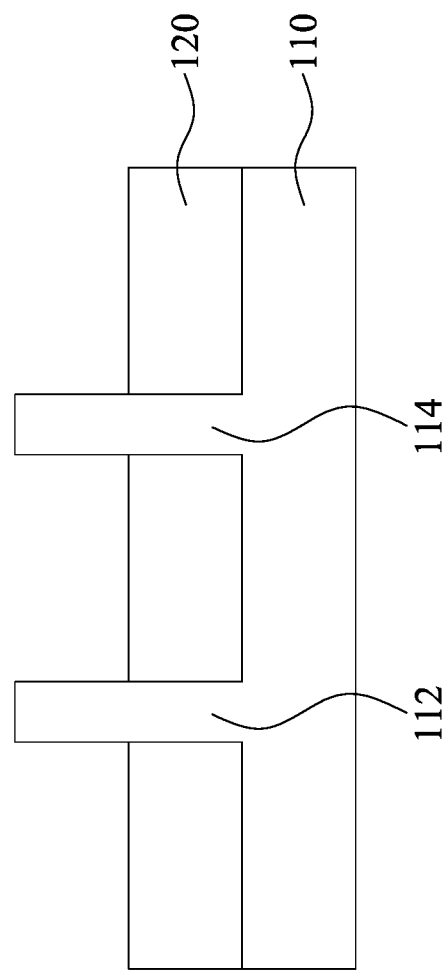
Figure 1D:
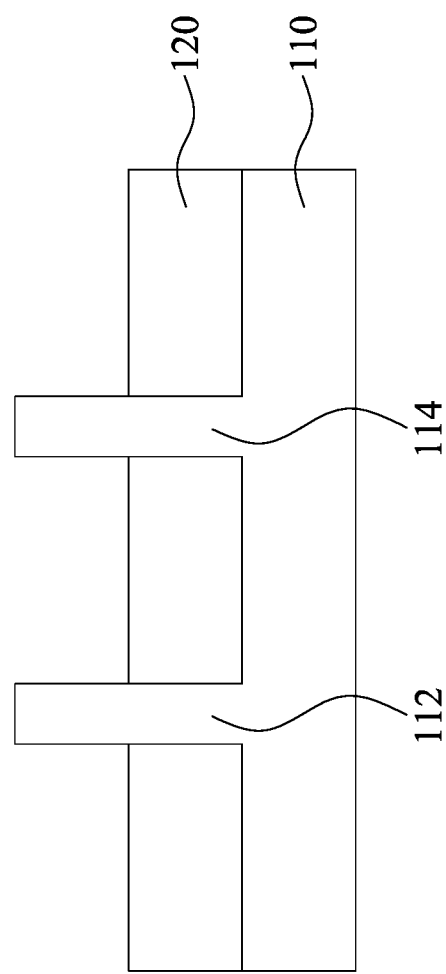

The following disclosure provides many different embodiments, or examples, for implementing different features of the provided subject matter. Specific examples of components and arrangements are described below to simplify the present disclosure. These are, of course, merely examples and are not intended to be limiting. For example, the formation of a first feature over or on a second feature in the description that follows may include embodiments in which the first and second features are formed in direct contact, and may also include embodiments in which additional features may be formed between the first and second features, such that the first and second features may not be in direct contact. In addition, the present disclosure may repeat reference numerals and/or letters in the various examples. This repetition is for the purpose of simplicity and clarity and does not in itself dictate a relationship between the various embodiments and/or configurations discussed.

Further, spatially relative terms, such as "beneath," "below," "lower," "above," "upper" and the like, may be used herein for ease of description to describe one element or feature's relationship to another element(s) or feature(s) as illustrated in the figures. The spatially relative terms are intended to encompass different orientations of the device in use or operation in addition to the orientation depicted in the figures. The apparatus may be otherwise oriented (rotated 90 degrees or at other orientations) and the spatially relative descriptors used herein may likewise be interpreted accordingly.

As used herein, "around," "about," "approximately," or "substantially" shall generally mean within 20 percent, or within 10 percent, or within 5 percent of a given value or range. Numerical quantities given herein are approximate, meaning that the term "around," "about," "approximately," or "substantially" can be inferred if not expressly stated.

The fins may be patterned by any suitable method. For example, the fins may be patterned using one or more photolithography processes, including double-patterning or multi-patterning processes. Generally, double-patterning or multi-patterning processes combine photolithography and self-aligned processes, allowing patterns to be created that have, for example, pitches smaller than what is otherwise obtainable using a single, direct photolithography process. For example, in one embodiment, a sacrificial layer is formed over a substrate and patterned using a photolithography process. Spacers are formed alongside the patterned sacrificial layer using a self-aligned process. The sacrificial layer is then removed, and the remaining spacers may then be used to pattern the fins.

Some embodiments of the present disclosure relate to semiconductor devices having cut gate structures. The cut gate structures, which include removal of dummy gates, improve the routing resources usage. The removal of dummy gates also reduces power consuming and parasitic capacitance of the semiconductor device. These embodiments are discussed below in the context of forming FinFET transistors having multiple fins on a bulk semiconductor substrate.

FIGS. 1A to 6D illustrate a method in various stages of manufacturing a semiconductor device in accordance with some embodiments of the present disclosure. Throughout the various views and illustrative embodiments, like reference numbers are used to designate like elements. FIG. 1A is a top view of a method for manufacturing the semiconductor device in various stages according to some embodiments, FIG. 1B is a cross-sectional view taken along line B-B of FIG. 1A, FIG. 1C is a cross-sectional view taken along line C-C of FIG. 1A, and FIG. 1D is a cross-sectional view taken along line D-D of FIG. 1A. A substrate 110 is provided. The substrate 110 includes first semiconductor fins 112 and second semiconductor fins 114 protruded from a top surface of the substrate 110. In some embodiments, the first semiconductor fins 112 and the second semiconductor fins 114 include silicon. It is noted that the numbers of the first semiconductor fins 112 and the second semiconductor fins 114 in FIGS. 1A-1D are illustrative, and should not limit the claimed scope of the present disclosure.

In some embodiments, the substrate 110 may be a semiconductor material and may include a graded layer or a buried oxide, for example. In some embodiments, the substrate 110 includes bulk silicon that may be undoped or doped (e.g., p-type, n-type, or a combination thereof). Other materials that are suitable for semiconductor device formation may be used. Other materials, such as germanium, quartz, sapphire, and glass could alternatively be used for the substrate 110. Alternatively, the silicon substrate 110 may be an active layer of a semiconductor-on-insulator (SOI) substrate or a multi-layered structure such as a silicon-germanium layer formed on a bulk silicon layer.

The first semiconductor fins 112 and the second semiconductor fins 114 may be formed, for example, by patterning and etching the substrate 110 using photolithography techniques. In some embodiments, a layer of photoresist material (not shown) is deposited over the substrate 110. The layer of photoresist material is irradiated (exposed) in accordance with a desired pattern (the first semiconductor fins 112 and the second semiconductor fins 114 in this case) and developed to remove a portion of the photoresist material. The remaining photoresist material protects the underlying material from subsequent processing steps, such as etching. It should be noted that other masks, such as an oxide or silicon nitride mask, may also be used in the etching process.

In some other embodiments, the first semiconductor fins 112 and the second semiconductor fins 114 may be epitaxially grown. For example, exposed portions of an underlying material, such as an exposed portion of the substrate 110, may be used in an epitaxial process to form the first semiconductor fins 112 and the second semiconductor fins 114. A mask may be used to control the shape of the first semiconductor fins 112 and the second semiconductor fins 114 during the epitaxial growth process.

A plurality of isolation structures 120, such as shallow trench isolation (STI), are formed in the substrate 110 to separate various devices. The formation of the isolation structures 120 may include etching a trench in the substrate 110 and filling the trench by an insulator material such as silicon oxide, silicon nitride, or silicon oxynitride. The filled trench may have a multi-layer structure such as a thermal oxide liner layer with silicon nitride filling the trench. In some embodiments, the isolation structures 120 may be created using a process sequence such as: growing a pad oxide, forming a low pressure chemical vapor deposition (LPCVD) nitride layer, patterning an STI opening using photoresist and masking, etching a trench in the substrate 110 (to form the semiconductor fins 112 and 114), optionally growing a thermal oxide trench liner to improve the trench interface, filling the trench with oxide, using chemical mechanical planarization (CMP) to remove the excessive oxide, and recessing the thermal oxide trench liner and the oxide to form the isolation structures 120 such that top portions of the semiconductor fins 112 and 114 protrude from top surfaces of the isolation structures 120.

Figure 2A:
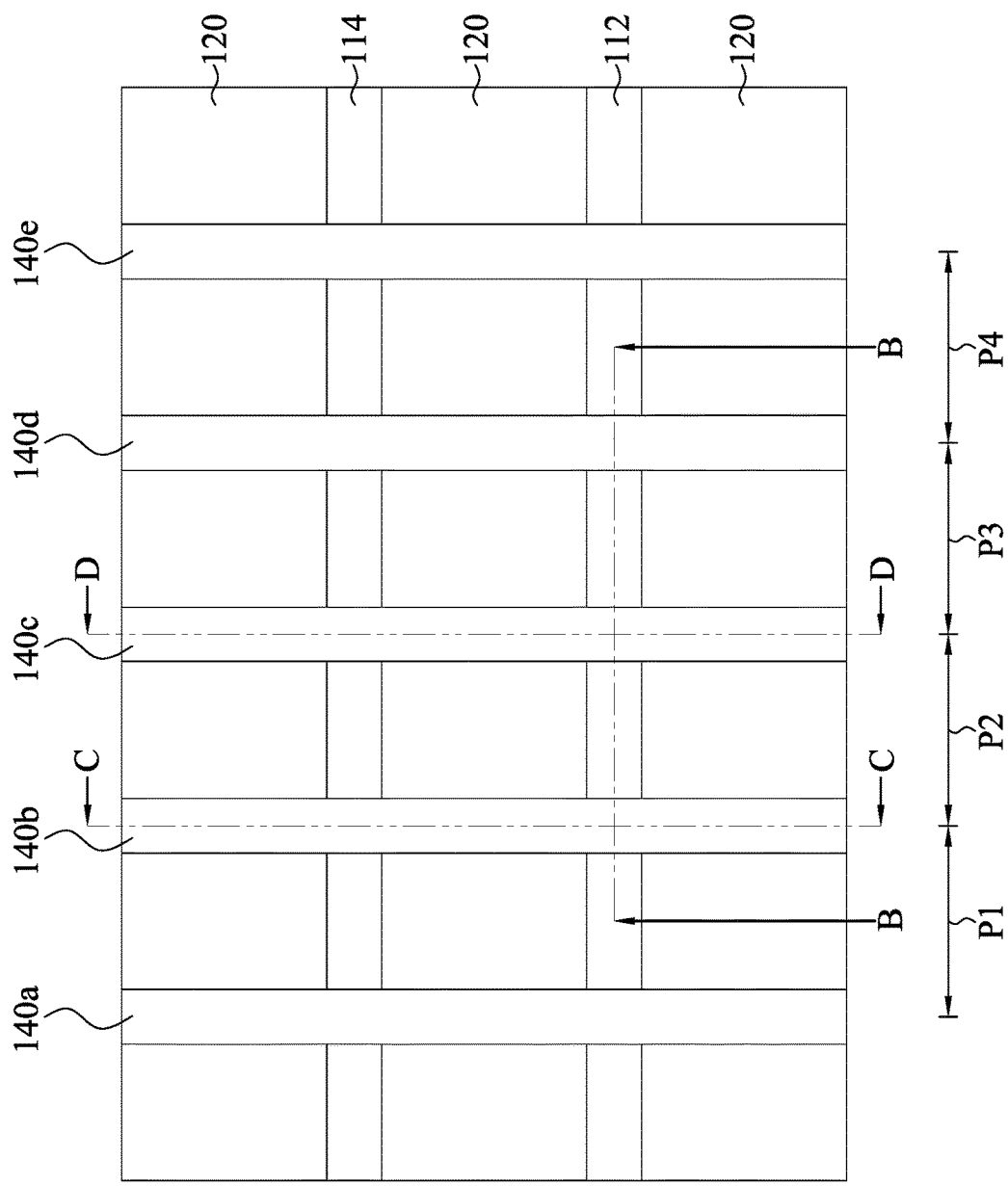
Figure 2B:
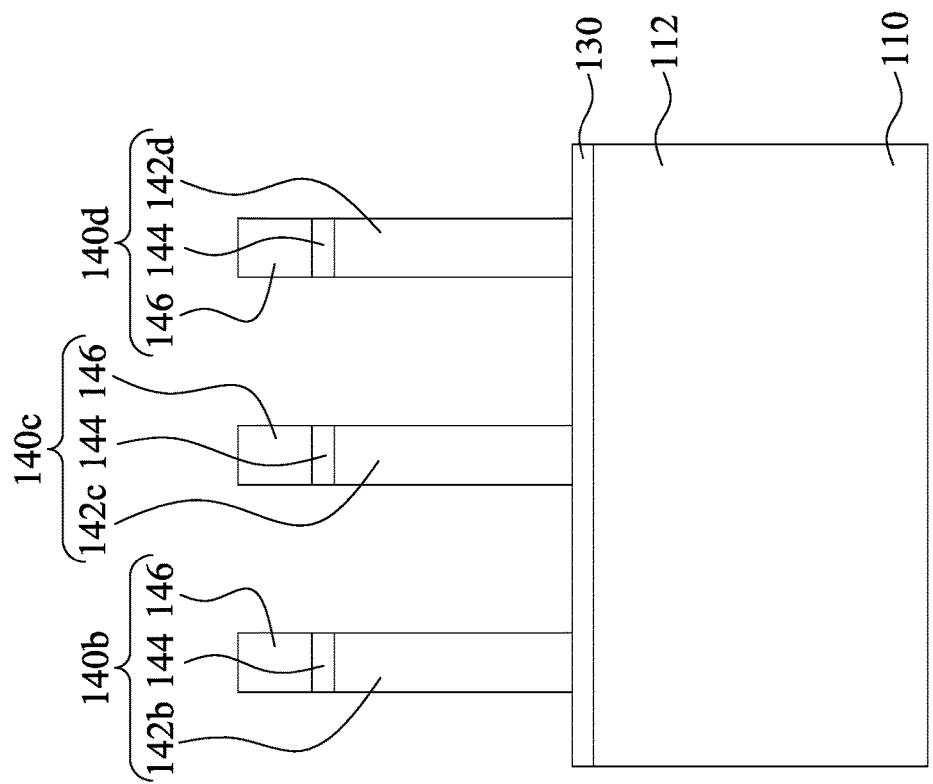
Figure 2C:
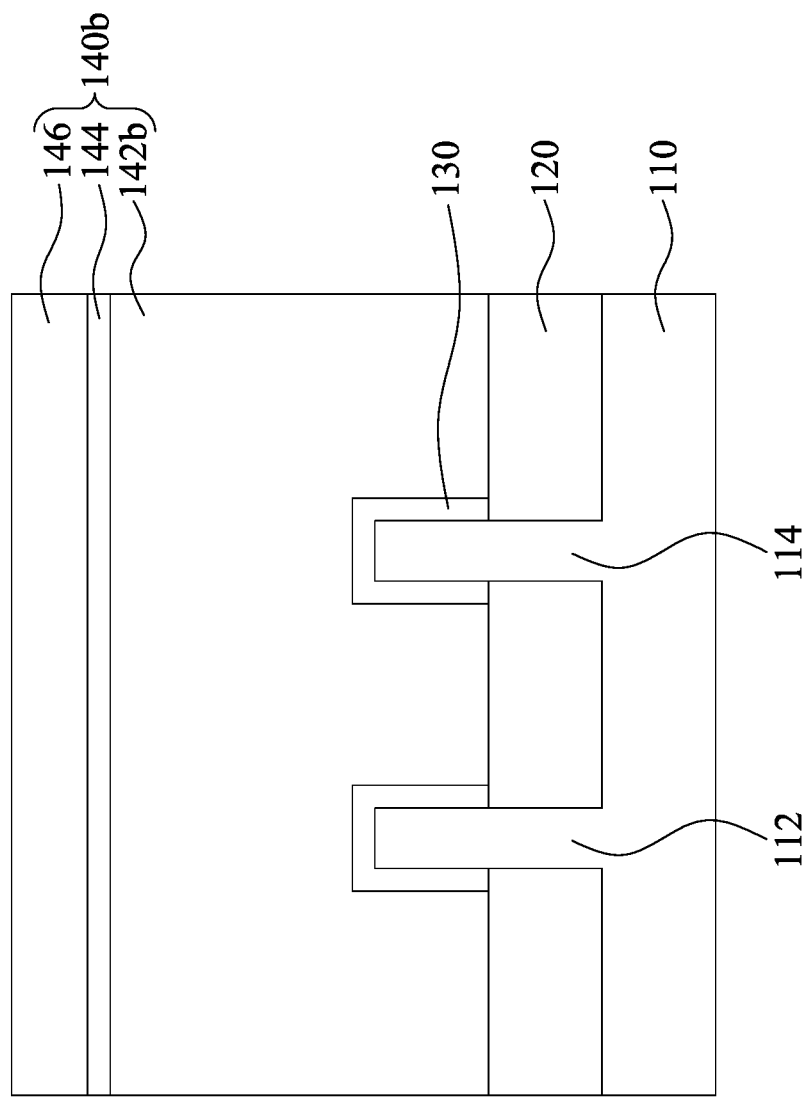
Figure 2D:
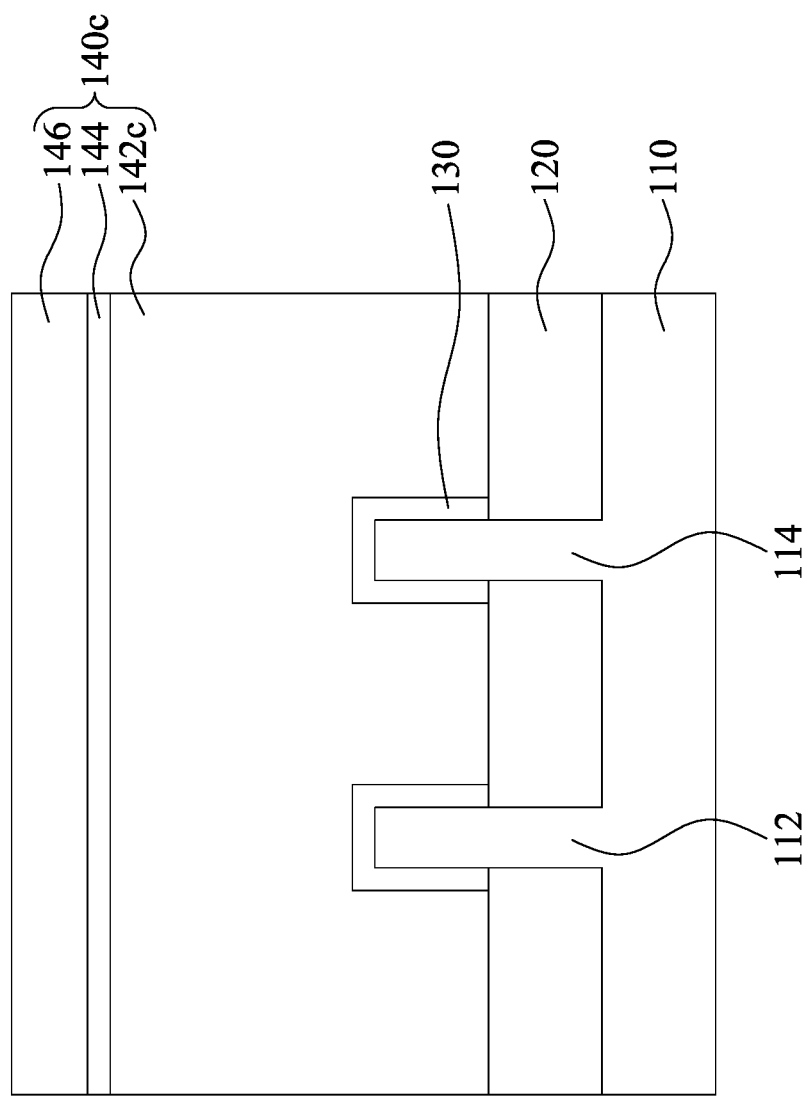

FIG. 2A is a top view of a method for manufacturing the semiconductor device in various stages according to some embodiments, FIG. 2B is a cross-sectional view taken along line B-B of FIG. 2A, FIG. 2C is a cross-sectional view taken along line C-C of FIG. 2A, and FIG. 2D is a cross-sectional view taken along line D-D of FIG. 2A. An interfacial layer 130 is conformally formed to cover the semiconductor fins 112 and 114. For clarity, the interfacial layer 130 is shown in FIGS. 2B-2D and omitted in FIG. 2A. In some embodiments, the interfacial layer 130 may include silicon dioxide, silicon nitride, a high-K dielectric material, or other suitable material. In various examples, the interfacial layer 130 may be deposited by a thermal oxidation process, an ALD process, a CVD process, a subatmospheric CVD (SACVD) process, a flowable CVD process, a PVD process, or other suitable process. By way of example, the interfacial layer 130 may be used to prevent damage to the semiconductor fins 112 and 114 by subsequent processing (e.g., subsequent formation of the gate structures).

Subsequently, gate stacks 140a, 140b, 140c, 140d, and 140e are formed above the interfacial layer 130. Each of the gate stacks 140a-140e includes a gate structure 142a (or 142b or 142c or 142d or 142e), a pad layer 144 formed over the gate structure 142a (or 142b or 142c or 142d or 142e), and a hard mask layer 146 formed over the pad layer 144. In some embodiments, a gate layer (not shown) may be formed over the interfacial layer 130, and the pad layers 144 and the hard mask layers 146 are formed over the gate layer. The gate layer is then patterned using the pad layers 144 and the hard mask layers 146 as masks to form the gate structure 142a-142e. As such, the gate structures 142a, 142b, 142c, 142d, 142e, the pad layer 144, and the hard mask layer 146 are referred to as the dummy gate stacks 140a, 140b, 140c, 140d, and 140e. In some embodiments, the gate structures 142a-142e may be made of polycrystalline-silicon (poly-Si), poly-crystalline silicon-germanium (poly-SiGe), or other suitable materials. The pad layer 144 may be made of silicon dioxide or other suitable materials, and the hard mask layer 146 may be made of silicon nitride or other suitable materials. If a gate-first technology is employed, the gate structures 142a-142e and the interfacial layer 130 are used as a gate electrode and a gate dielectric layer.

In FIG. 2A, the gate stacks 140a-140e have substantially the same pitch. That is, a pitch P1 between the gate stack 140a and the gate stack 140b is substantially the same as a pitch P2 between the gate stack 140b and the gate stack 140c, the pitch P2 between the gate stack 140b and the gate stack 140c is substantially the same as a pitch P3 between the gate stack 140c and the gate stack 140d, and the pitch P3 between the gate stack 140c and the gate stack 140d is substantially the same as a pitch P4 between the gate stack 140d and the gate stack 140e. In some embodiments, the pitch P1 may be in a range of about 20 nm to about 100 nm.

Figure 3A:
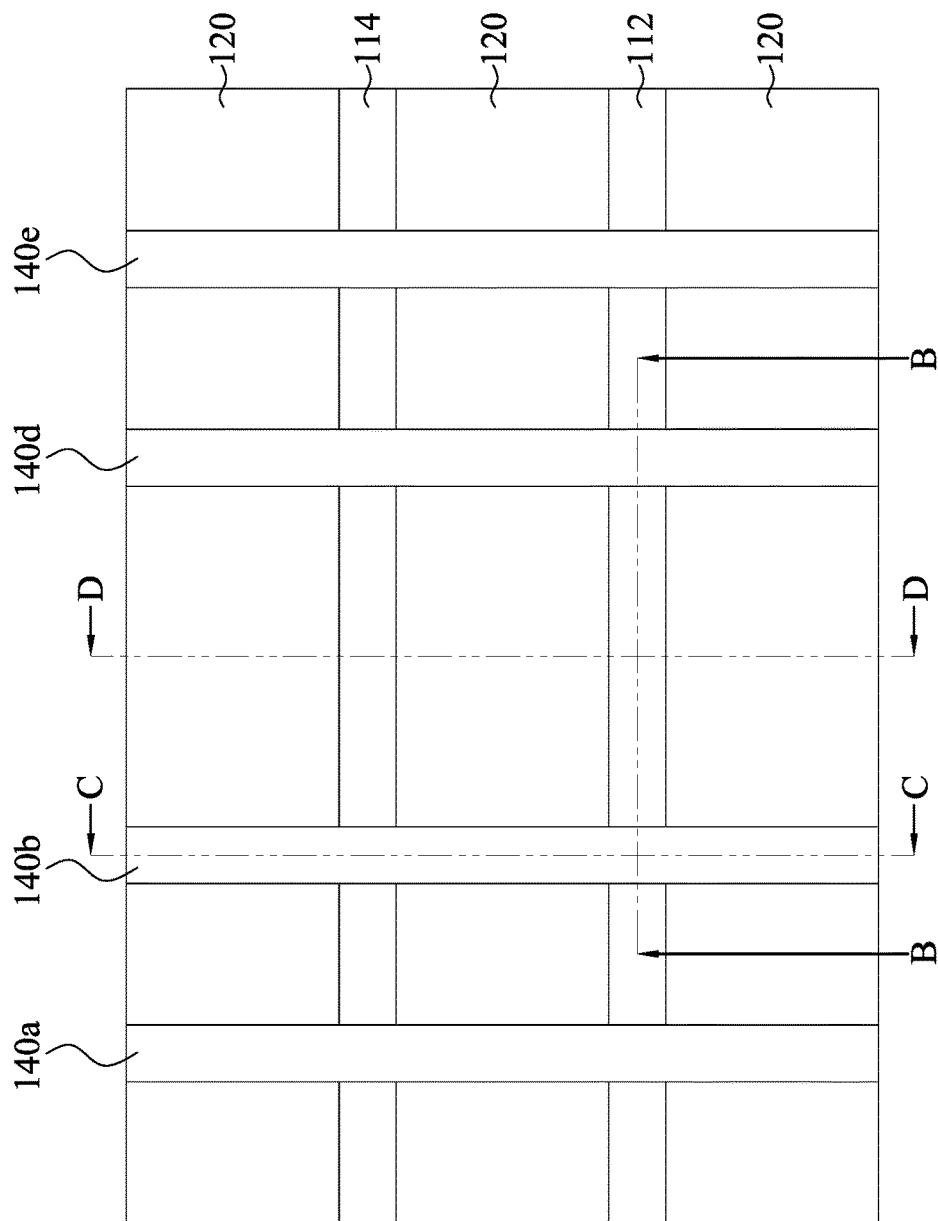
Figure 3B:
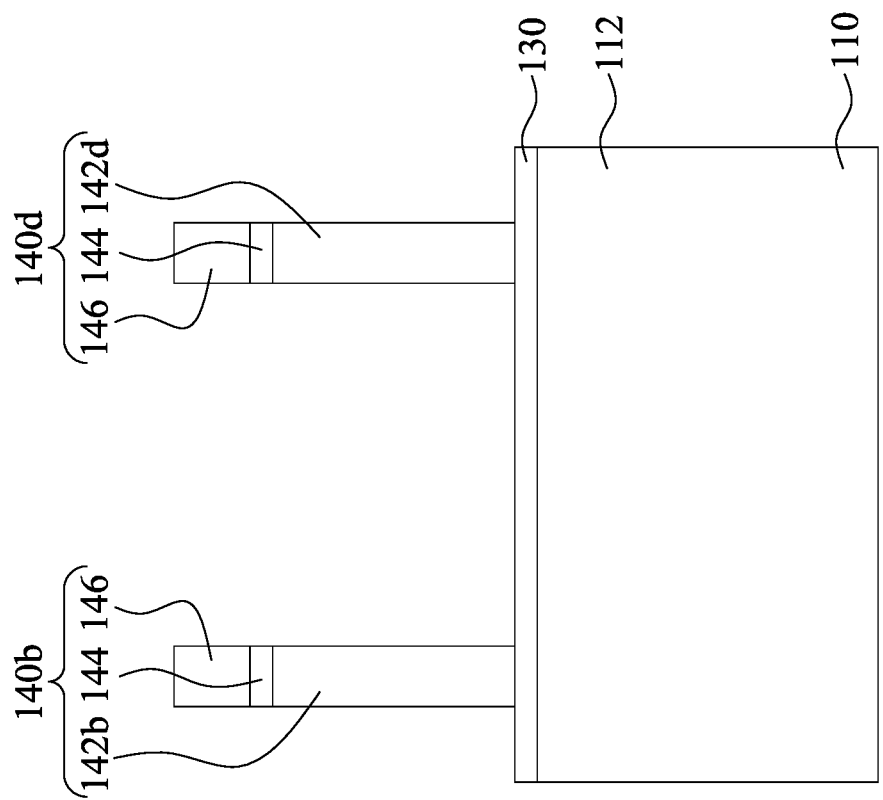
Figure 3D:
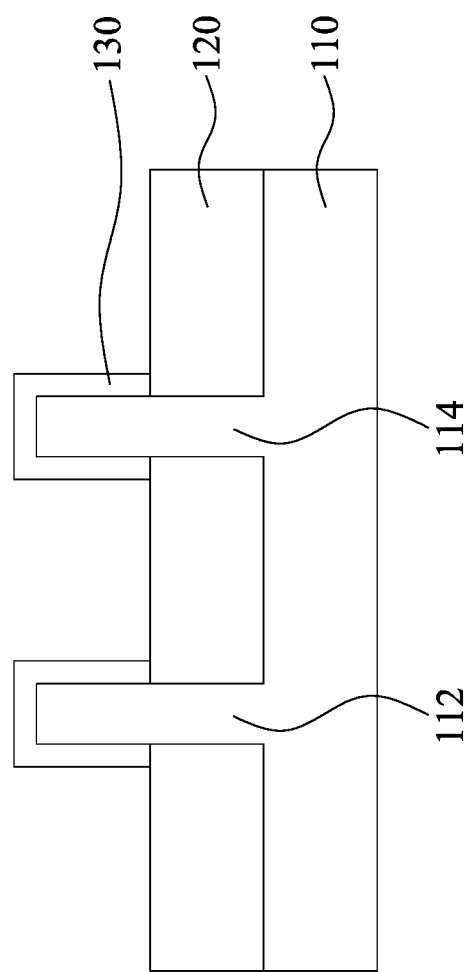

FIG. 3A is a top view of a method for manufacturing the semiconductor device in various stages according to some embodiments, FIG. 3B is a cross-sectional view taken along line B-B of FIG. 3A, FIG. 3C is a cross-sectional view taken along line C-C of FIG. 3A, and FIG. 3D is a cross-sectional view taken along line D-D of FIG. 3A. At least a portion of the gate stacks 140a-140e is removed. For example, in FIGS. 3A-3D, the gate stack 140c (see FIG. 2A) is removed, such that portions of the semiconductor fins 112 and 114 initially covered by the gate stack 140c are exposed. In some embodiments, a mask layer is formed above the gate stacks 140a-140e, and the mask layer is patterned to expose the gate stack 140c. The mask layer may be formed of a photo resist or a hard mask such as a silicon nitride layer. Subsequently, the exposed gate stack 140c is removed by, for example, etching process.

Figure 4A:
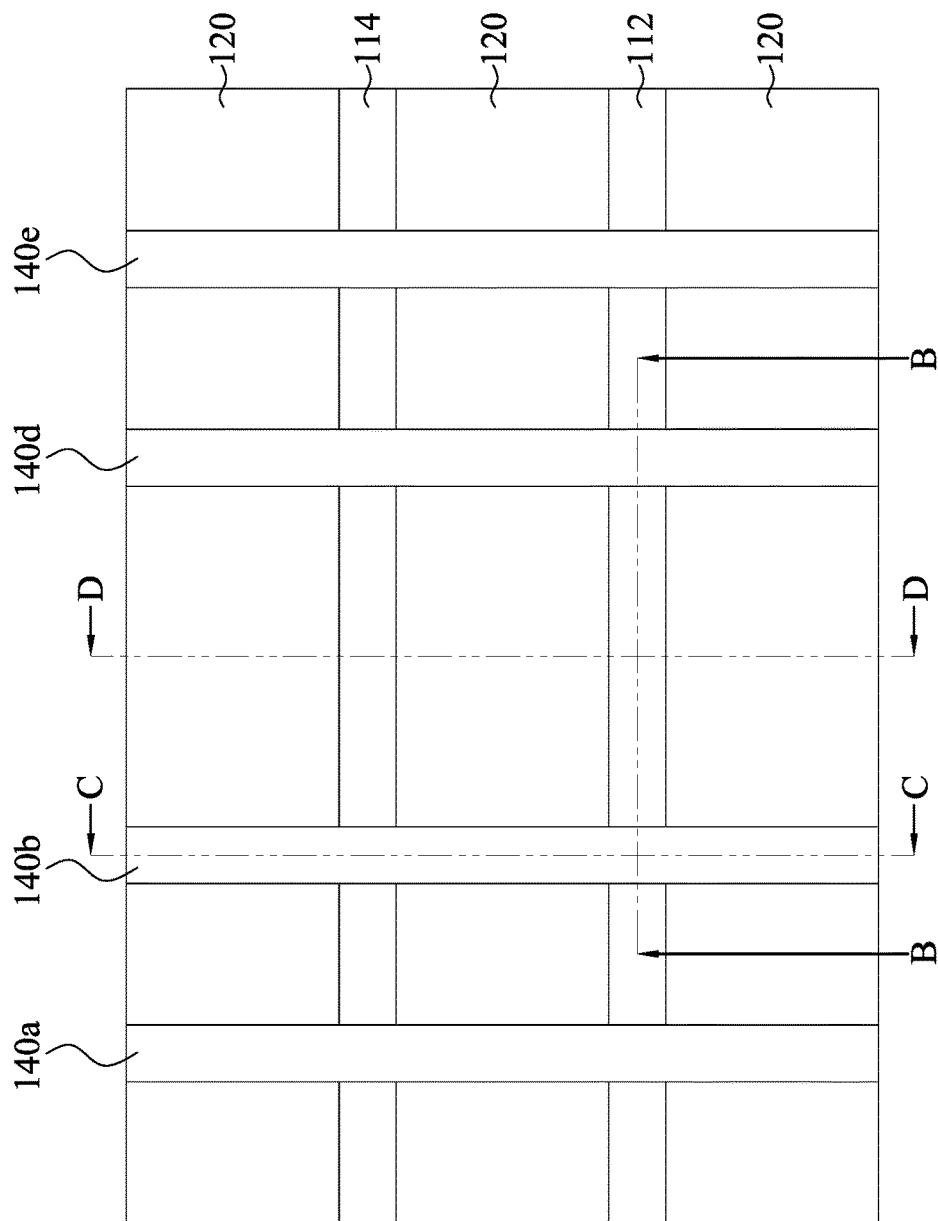
Figure 4B:
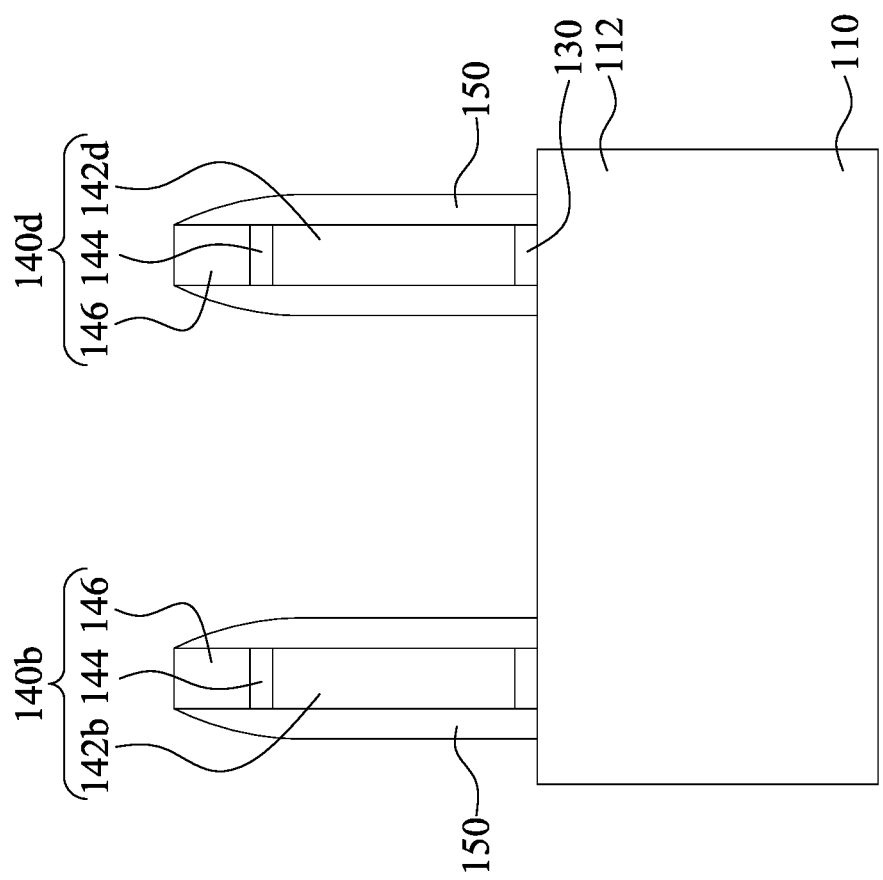
Figure 4D:
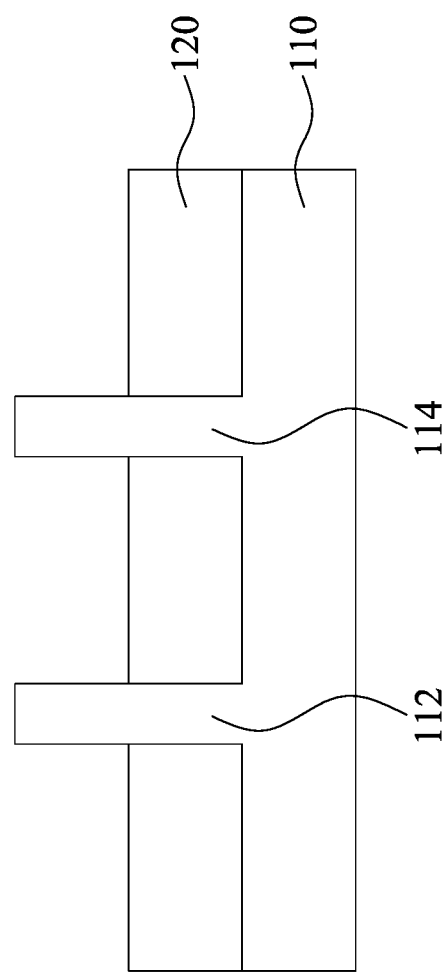

FIG. 4A is a top view of a method for manufacturing the semiconductor device in various stages according to some embodiments, FIG. 4B is a cross-sectional view taken along line B-B of FIG. 4A, FIG. 4C is a cross-sectional view taken along line C-C of FIG. 4A, and FIG. 4D is a cross-sectional view taken along line D-D of FIG. 4A. Portions of the interfacial layer 130 uncovered by the gate stacks 140a, 140b, 140d, and 140e are removed to expose portions of the semiconductor fins 112 and 114. Then, spacer structures 150 are at least formed on opposite sides of the gate stacks 140 and the interfacial layer 130. The spacer structures 150 may include a seal spacer and a main spacer (not shown). The spacer structures 150 include one or more dielectric materials, such as silicon oxide, silicon nitride, silicon oxynitride, SiCN, $SiC_xO_yN_z$, or combinations thereof. The seal spacers are formed on sidewalls of the gate stack 140 and the main spacers are formed on the seal spacers. The spacer structures 150 can be formed using a deposition method, such as plasma enhanced chemical vapor deposition (PECVD), low-pressure chemical vapor deposition (LPCVD), sub-atmospheric chemical vapor deposition (SACVD), or the like. The formation of the spacer structures 150 may include blanket forming spacer layers and then performing etching operations to remove the horizontal portions of the spacer layers. The remaining vertical portions of the spacer layers form the spacer structures 150.

Figure 5A:
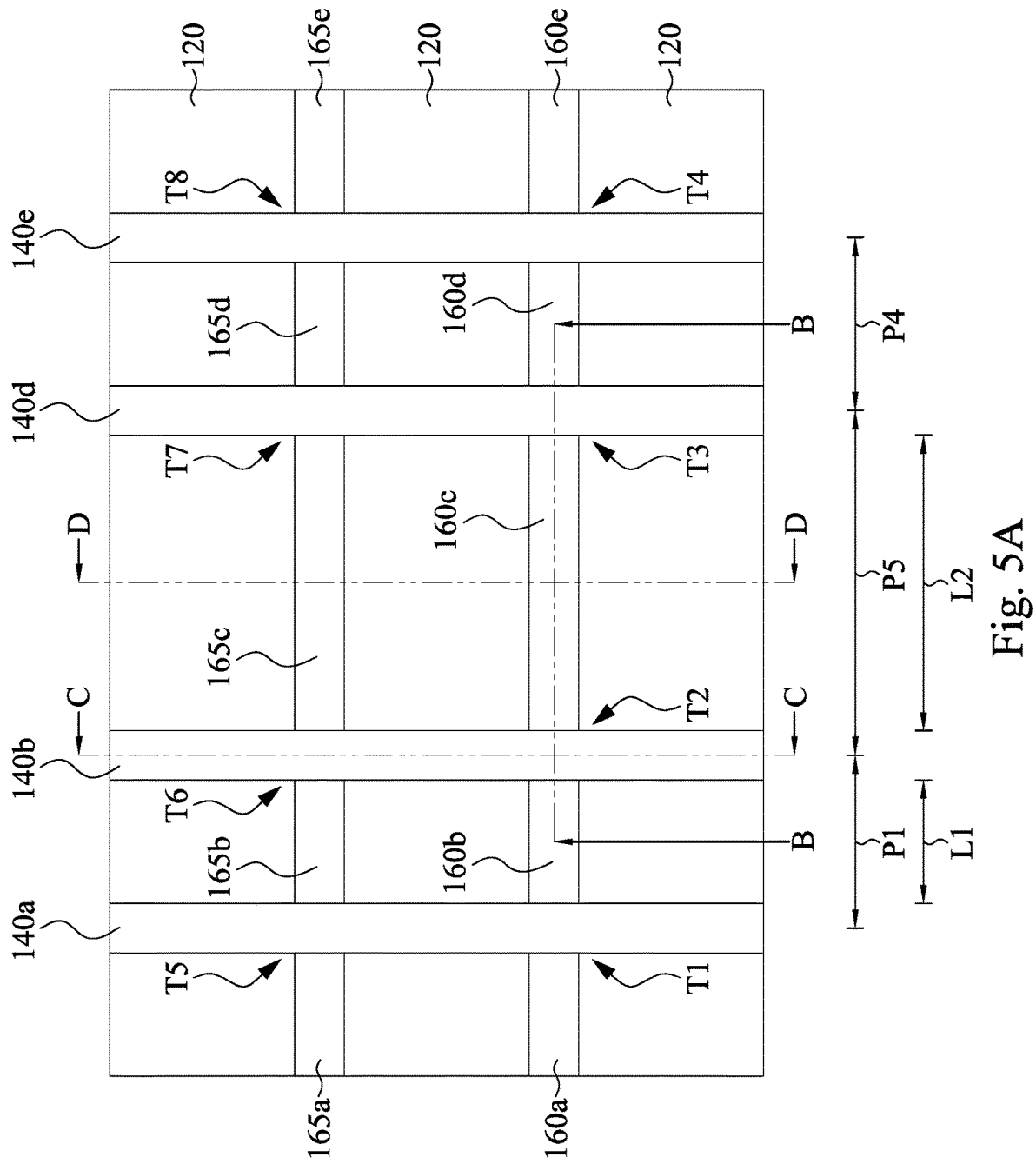
Figure 5B:
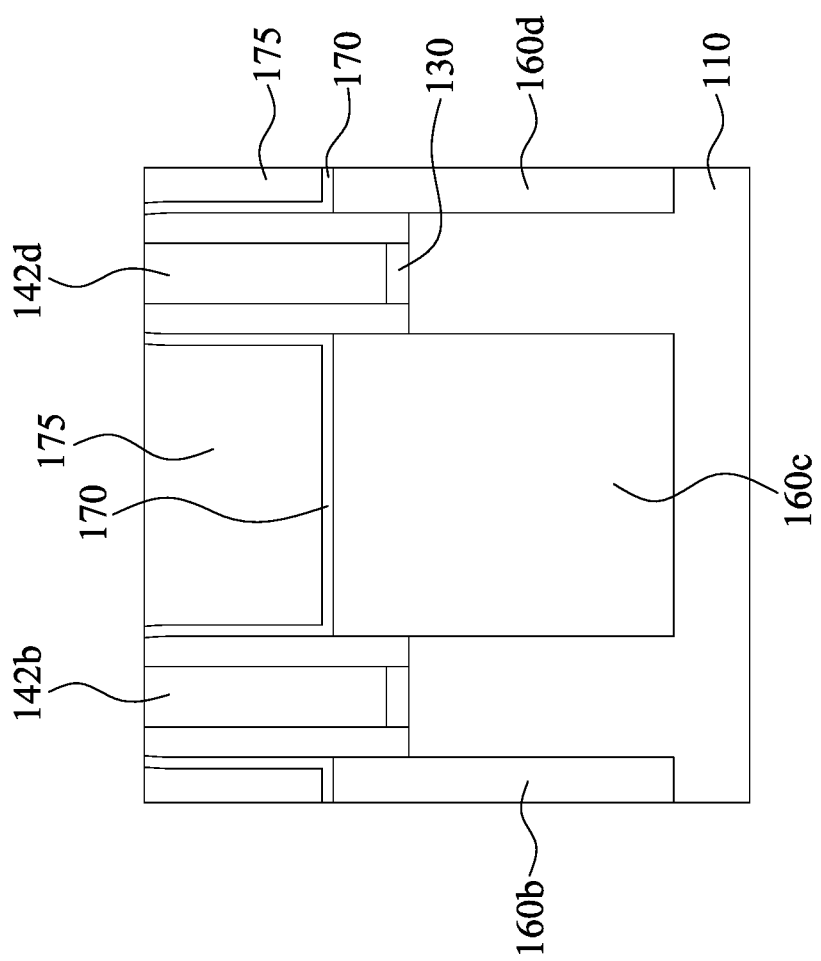
Figure 5C:
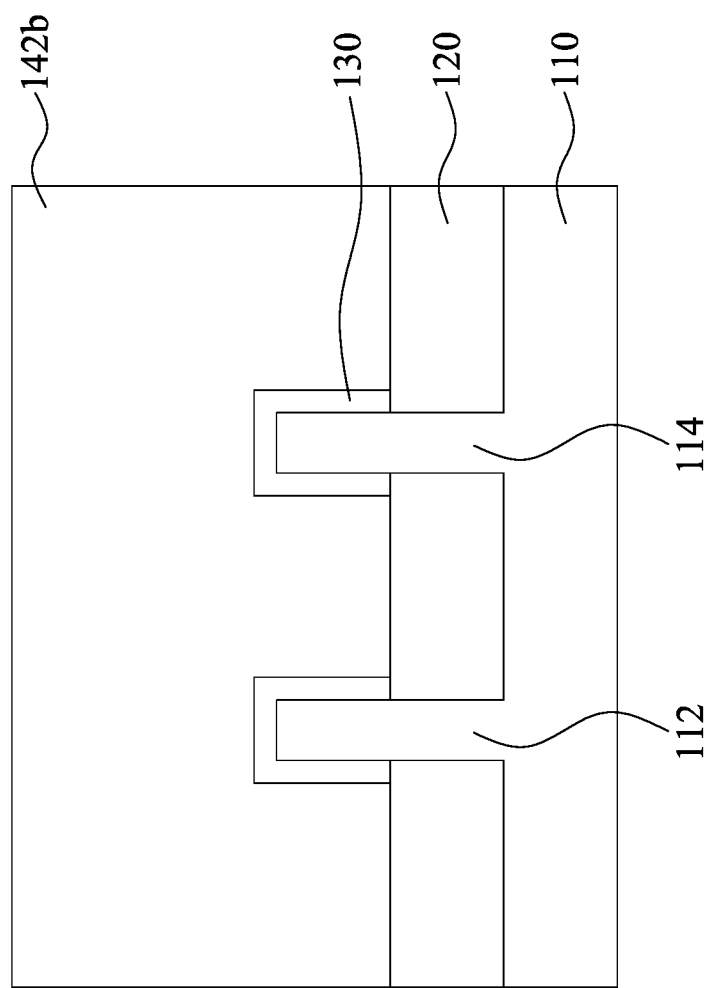
Figure 5D:
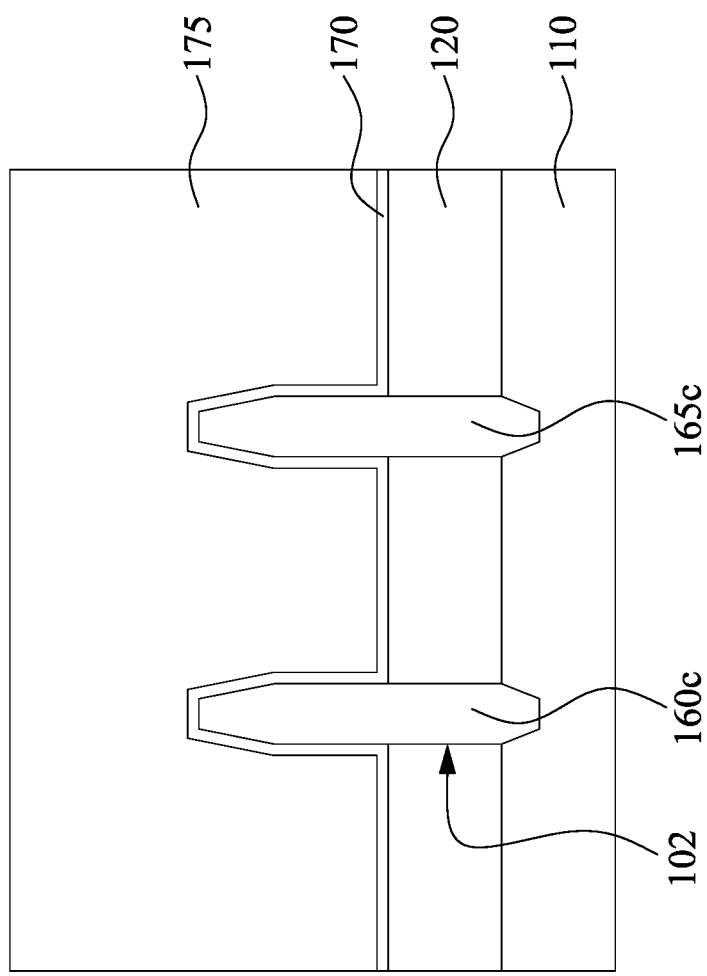

FIG. 5A is a top view of a method for manufacturing the semiconductor device in various stages according to some embodiments FIG. 5B is a cross-sectional view taken along line B-B of FIG. 5A, FIG. 5C is a cross-sectional view taken along line C-C of FIG. 5A, and FIG. 5D is a cross-sectional view taken along line D-D of FIG. 5A. Recesses 102 are respectively formed in portions of the semiconductor fins 112 and 114 uncovered by the gate stacks 140a, 140b, 140d, and 140e and the spacer structures 150. The gate stacks 140a, 140b, 140d, and 140e and the spacer structures 150 act as etching masks in the formation of the recesses. The etching process includes a dry etching process, a wet etching process, or combinations thereof. Epitaxial structures 160a-160e and 165a-165e are then formed in the recesses by performing, for example, a selectively growing process. The epitaxial structures 160a-160e are formed in the semiconductor fin 112, and the epitaxial structures 165a-165e are formed in the semiconductor fin 114.

The epitaxial structures 160a-160e and 165a-165e are formed by epitaxially growing a semiconductor material. The semiconductor material includes single element semiconductor material, such as germanium (Ge) or silicon (Si), compound semiconductor materials, such as gallium arsenide (GaAs) or aluminum gallium arsenide (AlGaAs), or semiconductor alloy, such as silicon germanium (SiGe) or gallium arsenide phosphide (GaAsP). The epitaxial structures 160a-160e and 165a-165e may be separated from each other as shown in FIG. 5D or be merged together. In some embodiments, the epitaxial structures 160a-160e and 165a-165e are source/drain epitaxial structures. In some embodiments, where an N-type device is desired, the epitaxial structures 160a-160e (or 165a-165e) may include an epitaxially growing silicon phosphorus (SiP) or silicon carbon (SiC). In some embodiments, where a P-type device is desired, the epitaxial structures 165a-165e (or 160a-160e) may include an epitaxially growing silicon germanium (SiGe). The epitaxial structures 160a-160e and 165a-165e formed over the semiconductor fins 112 and 114 have different conductivity types and may be formed in different processes. The epitaxial processes include CVD deposition techniques (e.g., vapor-phase epitaxy (VPE) and/or ultra-high vacuum CVD (UHV-CVD)), molecular beam epitaxy, and/or other suitable processes. In some embodiments, the formation of the epitaxial structures 160a-160e and 165a-165e is omitted.

Figure 6A:
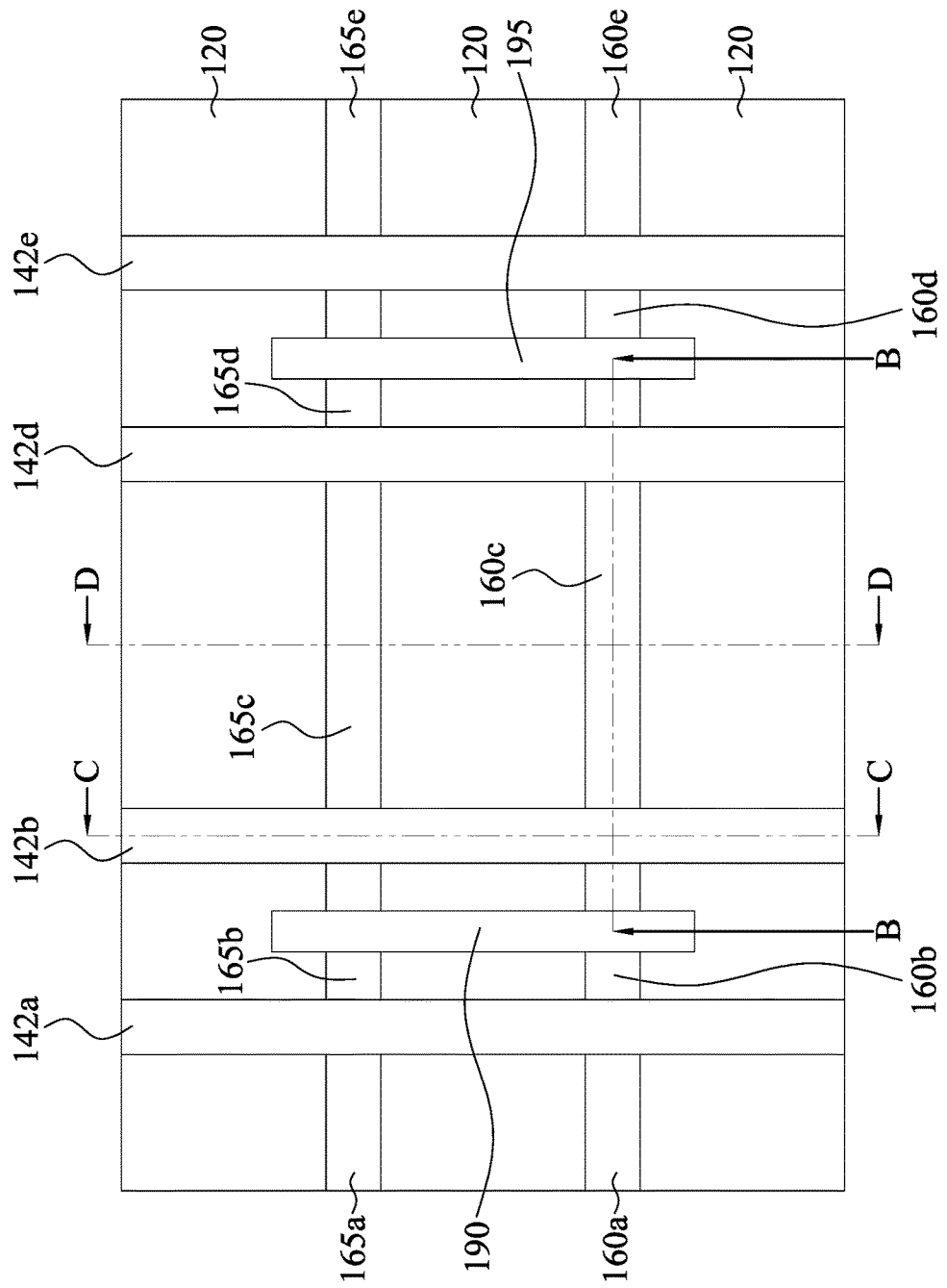

In FIG. 6A, the epitaxial structures 160a and 165a are formed on one side of the gate stack 140a, the epitaxial structures 160b and 165b are formed on another side of the gate stack 140a and between the gate stacks 140a and 140b, the epitaxial structures 160c and 165c are formed between the gate stacks 140b and 140d, the epitaxial structures 160d and 165d are formed on one side of the gate stack 140e and between the gate stacks 140d and 140e, and the epitaxial structures 160e and 165e are formed on another side of the gate stack 140e. Each of the epitaxial structures 160b, 160d, 165b, and 165d may have a length L1, and each of the epitaxial structures 160c and 165c may have a length L2 greater than the length L1.

The epitaxial structures 160a-160e and 165a-165e can be referred to as source/drain regions of corresponding transistors. The epitaxial structures 160a and 160b and the gate structure 142a form a transistor T1, the epitaxial structures 160b and 160c and the gate structure 142b form a transistor T2, the epitaxial structures 160c and 160d and the gate structure 142d form a transistor T3, the epitaxial structures 160d and 160e and the gate structure 142e form a transistor T4, the epitaxial structures 165a and 165b and the gate structure 142a form a transistor T5, the epitaxial structures 165b and 165c and the gate structure 142b form a transistor T6, the epitaxial structures 165c and 165d and the gate structure 142d form a transistor T7, and the epitaxial structures 165d and 165e and the gate structure 142e form a transistor T8.

The epitaxial structure 160b may be a source of the transistor T2, and the epitaxial structure 160c may be a drain of the transistor T2. The epitaxial structure 160d may be a source of the transistor T3, and the epitaxial structure 160c may be a drain of the transistor T3. That is, the transistors T2 and T3 share the same drain (i.e., the epitaxial structure 160c). Further, the epitaxial structure 165b may be a source of the transistor T6, and the epitaxial structure 165c may be a drain of the transistor T6. The epitaxial structure 165d may be a source of the transistor T7, and the epitaxial structure 165c may be a drain of the transistor T7. That is, the transistors T6 and T7 share the same drain (i.e., the epitaxial structure 165c).

The gate structures 142a and 142b have the pitch P1, the gate structures 142d and 142e have the pitch P4 substantially the same as the pitch P1, and the gate structures 142b and 142d have a pitch P5 greater than the pitch P1. For example, the pitch P5 of the gate structures 142b and 142d is substantially twice the pitch P1 of the gate structures 142a and 142b.

Subsequently, an interlayer dielectric (ILD) 170 is formed over the epitaxial structures 160a-160e and 165a-165e, the gate stacks 140a, 140b, 140d, and 140e, the spacer structures 150, and the isolation structure 120. The ILD 170 may be formed by chemical vapor deposition (CVD), high-density plasma CVD, spin-on, sputtering, or other suitable methods. In some embodiments, the ILD 170 includes silicon oxide. In some other embodiments, the ILD 170 may include silicon oxy-nitride, silicon nitride, or a low-k material. In some embodiments, a contact etch stop layer (CESL) is conformally formed over the epitaxial structures 160a-160e and 165a-165e, the gate stacks 140a, 140b, 140d, and 140e, the spacer structures 150, and the isolation structure 120 in advance, and the ILD 170 is formed over the CESL. Then, a planarization process, such as a chemical mechanical planarization (CMP) process, is performed to planarize the ILD 170 to expose the gate structures 142a, 142b, 142d, and 142e.

Figure 6B:
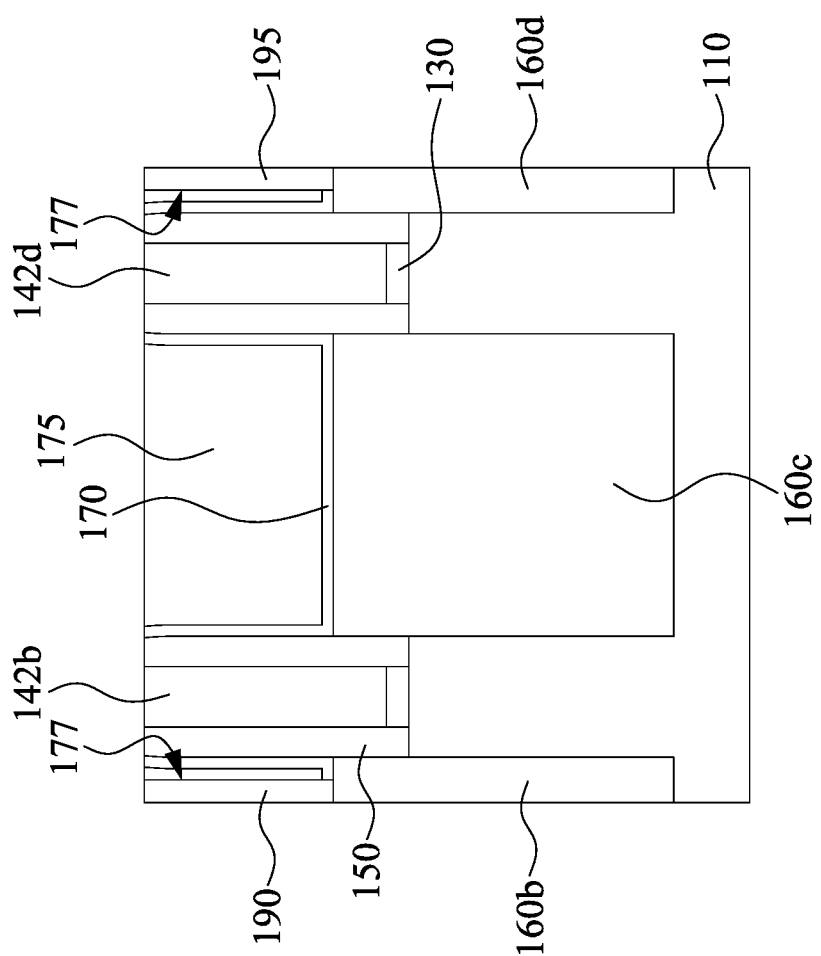
Figure 6C:
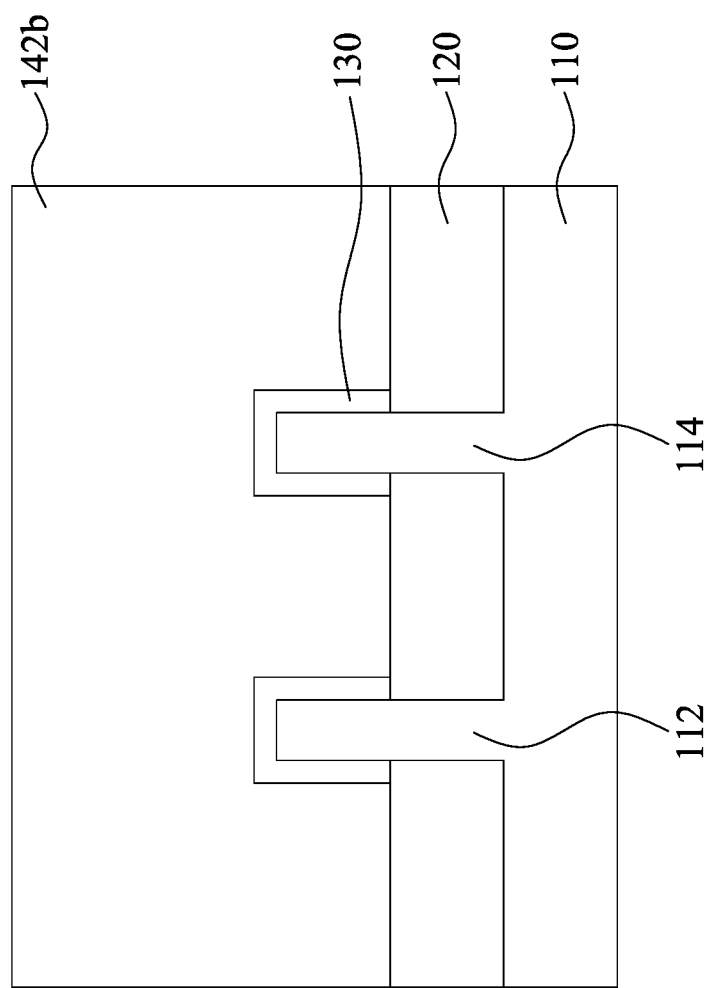
Figure 6D:
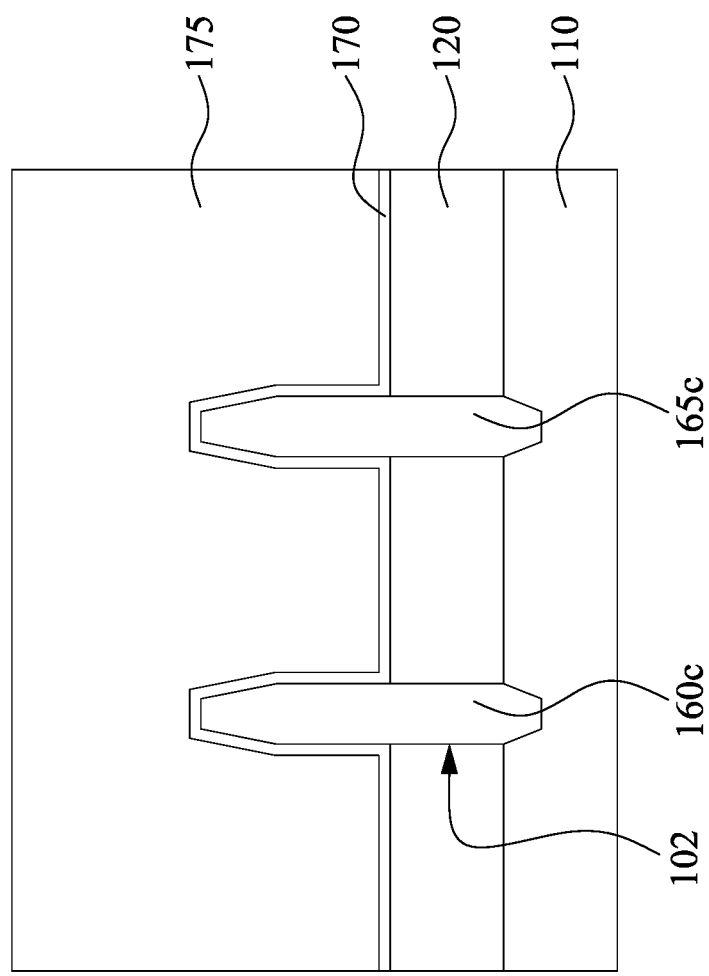

FIG. 6A is a top view of a method for manufacturing the semiconductor device in various stages according to some embodiments FIG. 6B is a cross-sectional view taken along line B-B of FIG. 6A, FIG. 6C is a cross-sectional view taken along line C-C of FIG. 6A, and FIG. 6D is a cross-sectional view taken along line D-D of FIG. 6A. A plurality of source/drain openings 177 are formed in the ILD 170, where the source/drain openings 177 expose some of the epitaxial structures (e.g., the epitaxial structures 160b, 160d, 165b, and 165d in this case). Subsequently, conductive materials are filled in the openings 177, and the excess portions of the conductive materials are removed to form contacts 190 and 195. The contacts 190 and 195 may be made of tungsten, aluminum, copper, or other suitable materials.

The contact 190 is formed above the epitaxial structures 160b and 165b, such that the epitaxial structure 160b is electrically connected to the epitaxial structure 165b through the contact 190. The contact 195 is formed above the epitaxial structures 160d and 165d, such that the epitaxial structure 160d is electrically connected to the epitaxial structure 165d through the contact 195. It is noted that the locations of the contacts 190 and 195 are not limited to the locations shown in FIG. 6A. The locations of the contacts are determined based on different circuit designs.

In FIG. 2A, the gate stack 140c is a dummy gate stack, which is not a functional gate in the semiconductor device. If the gate stack 140c is not removed, an additional conductive trace would be formed above the gate stack 140c to connect the drains of the transistors T2 and T3 (see FIG. 5A). Furthermore, another via may be connected to the gate structure 142c to ground the gate structure 142c. In FIG. 6A, however, the gate stack 140c is removed, the drains (i.e., the epitaxial structure 160c) of the transistors T2 and T3 is directly connected. With such configuration, the additional conductive trace and the via are omitted, and the metal routing resource in compact layout structure can be effectively saved. Moreover, without the grounded dummy gate, parasitic capacitance between the gate structures 142b and 142d is reduced, and the power consuming for grounding the dummy gate is also reduced. For example, when one or more N-type and P-type dummy gates are removed, the speed of the semiconductor device is increased by about 1.61% in some embodiments, and the power is saved by about 1.7% in some embodiments. When one or more N-type dummy gates are removed, the speed of the semiconductor device is increased by about 0.32% in some embodiments, and the power is saved by about 6.55% in some embodiments.

Figure 7A:
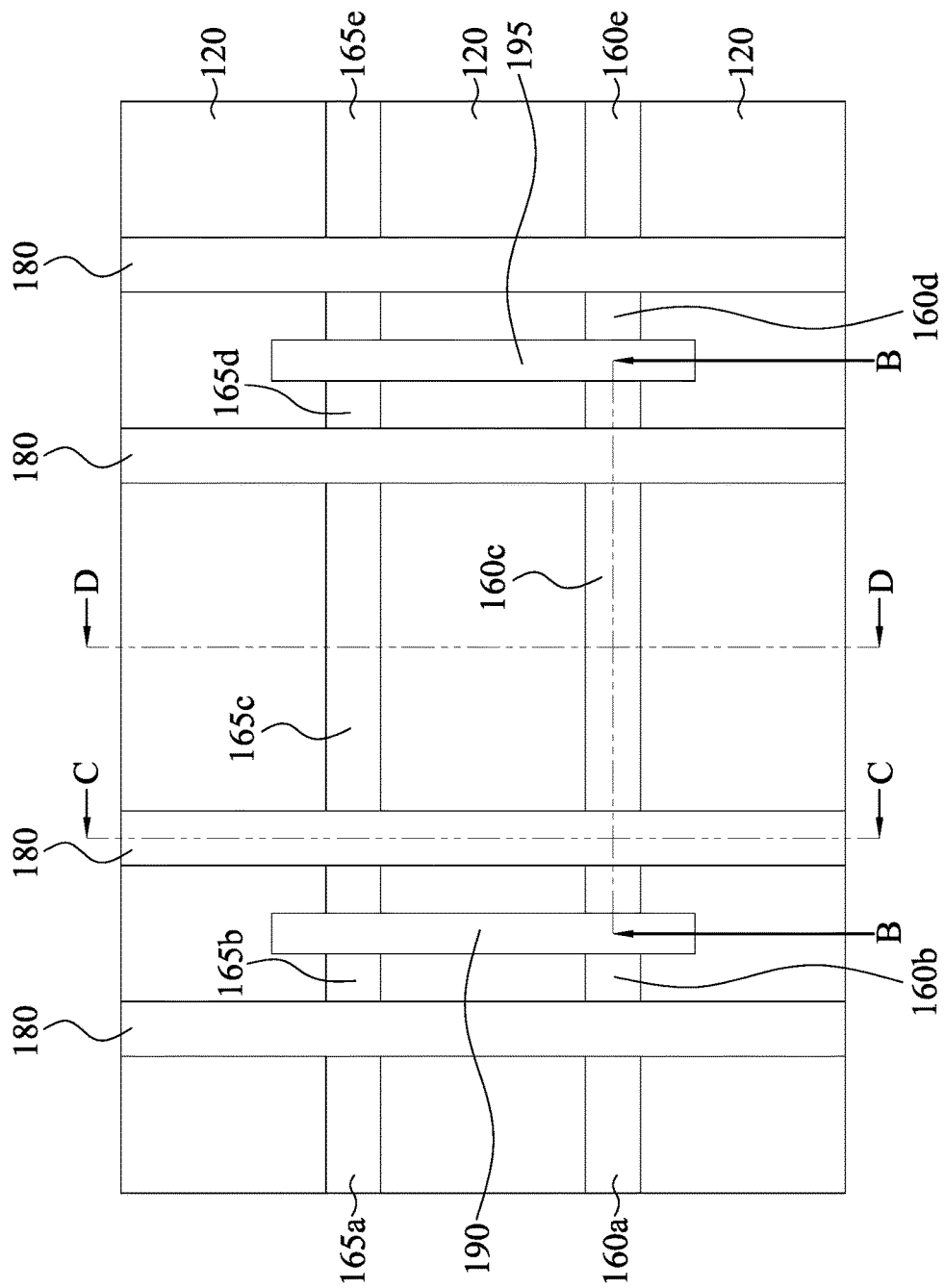
FIG. 7A is a top view of a semiconductor device in various stages according to some embodiments.
Figure 7B:
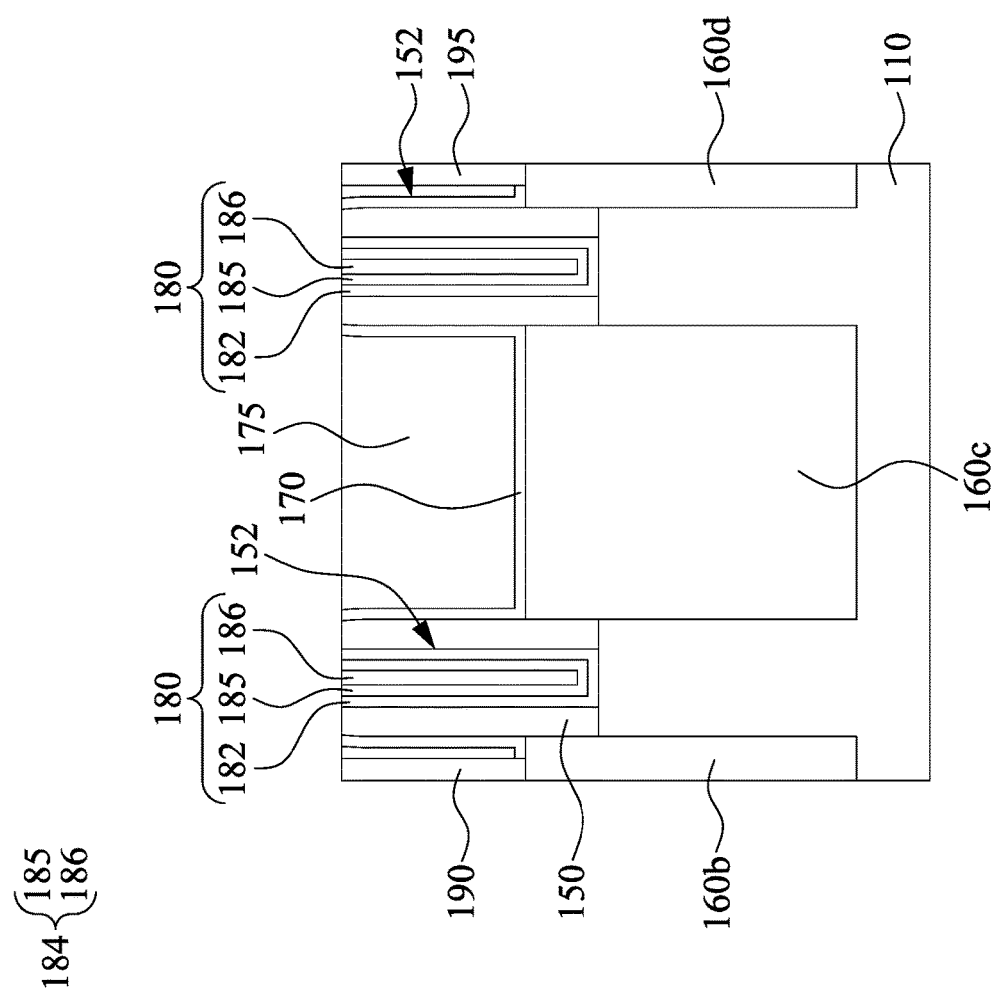
FIG. 7B is a cross-sectional view taken along line B-B of FIG. 7A.
Figure 7C:
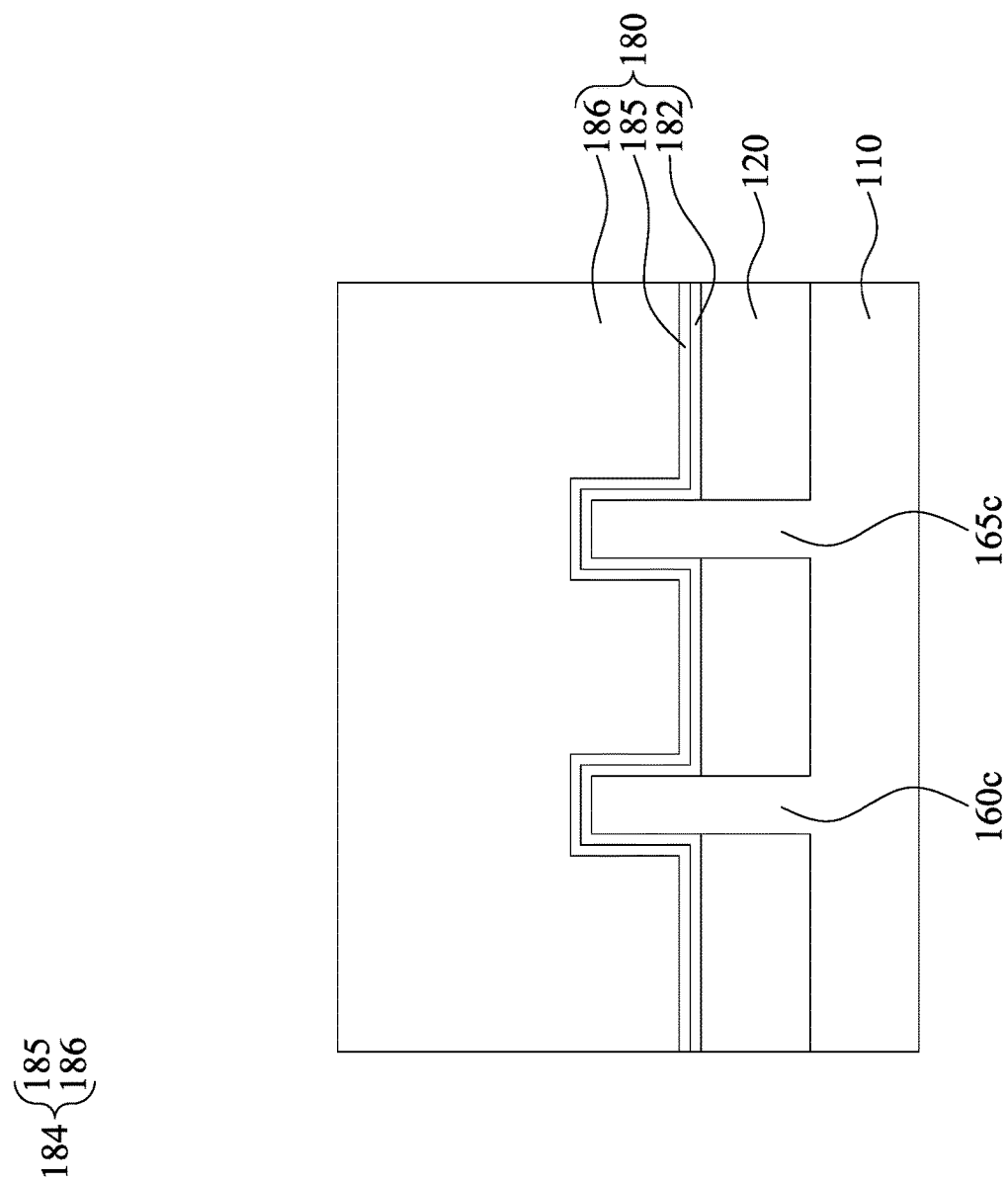
FIG. 7C is a cross-sectional view taken along line C-C of FIG. 7A.
Figure 7D:
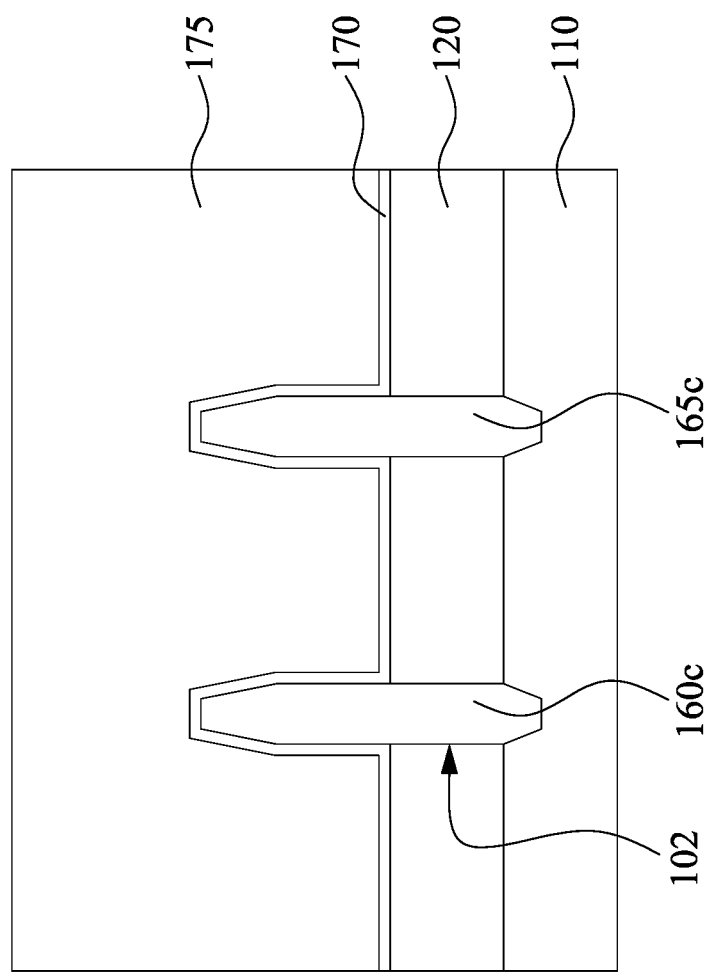
FIG. 7D is a cross-sectional view taken along line D-D of FIG. 7A.

In some embodiments, a replacement gate (RPG) process scheme is employed. In the RPG process scheme, a dummy polysilicon gate (e.g., the gate structures 142a, 142b, 142d, 142e (see FIGS. 6A-6D) in this case) is formed in advance and is replaced later by a metal gate. FIG. 7A is a top view of a semiconductor device in various stages according to some embodiments, FIG. 7B is a cross-sectional view taken along line B-B of FIG. 7A, FIG. 7C is a cross-sectional view taken along line C-C of FIG. 7A, and FIG. 7D is a cross-sectional view taken along line D-D of FIG. 7A. In some embodiments, the gate structures 142a, 142b, 142d, and 142e are removed to form openings 152 with the spacer structures 150 as their sidewalls. In some other embodiments, the interfacial layers 130 (see FIGS. 6B and 6C) are removed as well. Alternatively, in some embodiments, the gate structures 142a, 142b, 142d, and 142e are removed while the interfacial layers 130 retain. The gate structures 142a, 142b, 142d, and 142e (and the interfacial layers 130) may be removed by dry etch, wet etch, or a combination of dry and wet etch.

A plurality of gate structures 180 are then formed in the openings 152. The gate structures 180 crosses over the semiconductor fins 112 and/or 114. The gate structures 180 may be referred to as functional gate structures. In some embodiments, each of the gate structures 180 includes a gate dielectric layer 182 and a gate electrode 184 above the gate dielectric layer 182.

The gate dielectric layer 182 is conformally formed in the opening 152. The gate dielectric layer 182 is over the semiconductor fins 112 and/or 114. The gate dielectric layer 182 can be a high-κ dielectric layer having a dielectric constant (κ) higher than the dielectric constant of $SiO_2$, i.e. κ>3.9. The gate dielectric layer 182 may include LaO, AlO, ZrO, TiO, $Ta_2O_5$, $Y_2O_3$, $SrTiO_3$ (STO), $BaTiO_3$ (BTO), BaZrO, HfZrO, HfLaO, HfSiO, LaSiO, AlSiO, HfTaO, HMO, $(Ba,Sr)TiO_3$ (BST), $Al_2O_3$, or other suitable materials. The gate dielectric layer 182 is deposited by suitable techniques, such as ALD, CVD, PVD, thermal oxidation, combinations thereof, or other suitable techniques.

The gate electrode 184 may include work function metal layer(s) 185, capping layer(s), filling layer(s) 186, and/or other suitable layers that are desirable in a metal gate stack. The work function metal layer 185 may include n-type and/or p-type work function metal. Exemplary n-type work function metals include Ti, Ag, TaAl, TaAlC, TiAlN, TaC, TaCN, TaSiN, Mn, Zr, other suitable n-type work function materials, or combinations thereof. Exemplary p-type work function metals include TiN, TaN, Ru, Mo, Al, WN, $ZrSi_2$, $MoSi_2$, $TaSi_2$, $NiSi_2$, WN, other suitable p-type work function materials, or combinations thereof. The work function metal layer 185 may have multiple layers. The work function metal layer(s) 185 may be deposited by CVD, PVD, electroplating and/or other suitable process. In some embodiments, the gate electrode 184 is a p-type metal gate including a p-type work function metal layer. In some embodiments, the capping layer in the gate electrode 184 may include refractory metals and their nitrides (e.g. TiN, TaN, $W_2N$, TiSiN, TaSiN). The capping layer may be deposited by PVD, CVD, metal-organic chemical vapor deposition (MOCVD) ALD, or the like. In some embodiments, the filling layer 186 may include tungsten (W) or other suitable conductive materials. The filling layer 186 may be deposited by ALD, PVD, CVD, or other suitable process.

Figure 8:
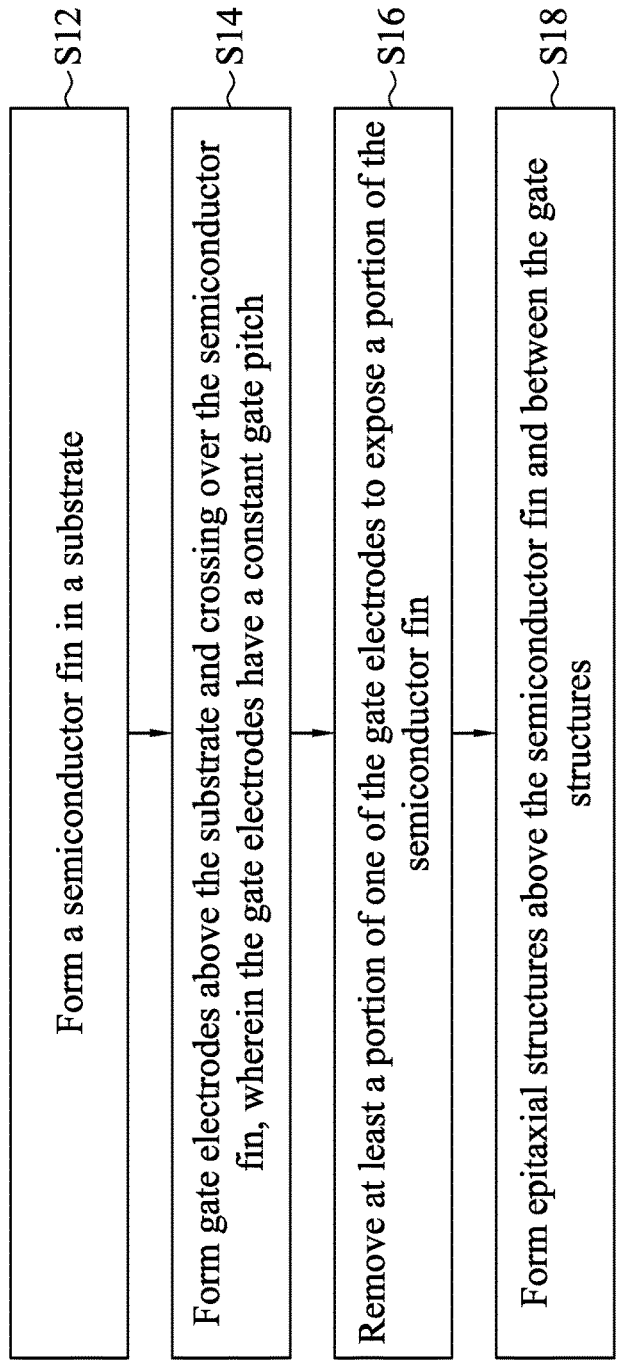
FIG. 8 is a flow chart of a method for forming a semiconductor device in accordance with some embodiments of the present disclosure.

FIG. 8 is a flow chart of a method M for forming a semiconductor device in accordance with some embodiments of the present disclosure. Although the method M is illustrated and/or described as a series of acts or events, it will be appreciated that the method is not limited to the illustrated ordering or acts. Thus, in some embodiments, the acts may be carried out in different orders than illustrated, and/or may be carried out concurrently. Further, in some embodiments, the illustrated acts or events may be subdivided into multiple acts or events, which may be carried out at separate times or concurrently with other acts or sub-acts. In some embodiments, some illustrated acts or events may be omitted, and other un-illustrated acts or events may be included.

At block S12, a semiconductor fin is formed in a substrate. FIGS. 1A-1D illustrate a top view and cross-sectional views of some embodiments corresponding to act in block S12. At block S14, gate electrodes are formed above the substrate and crossing over the semiconductor fin, wherein the gate electrodes have a constant pitch. FIGS. 2A-2D illustrate a top view and cross-sectional views of some embodiments corresponding to act in block S14. At block S16, at least a portion of one of the gate electrodes is removed to expose a portion of the semiconductor fin. FIGS. 3A-3D illustrate a top view and cross-sectional views of some embodiments corresponding to act in block S16. At block S18, epitaxial structures are formed above the semiconductor fin and between the gate structures. FIGS. 4A-4D illustrate a top view and cross-sectional views of some embodiments corresponding to act in block S18.

Figure 9:
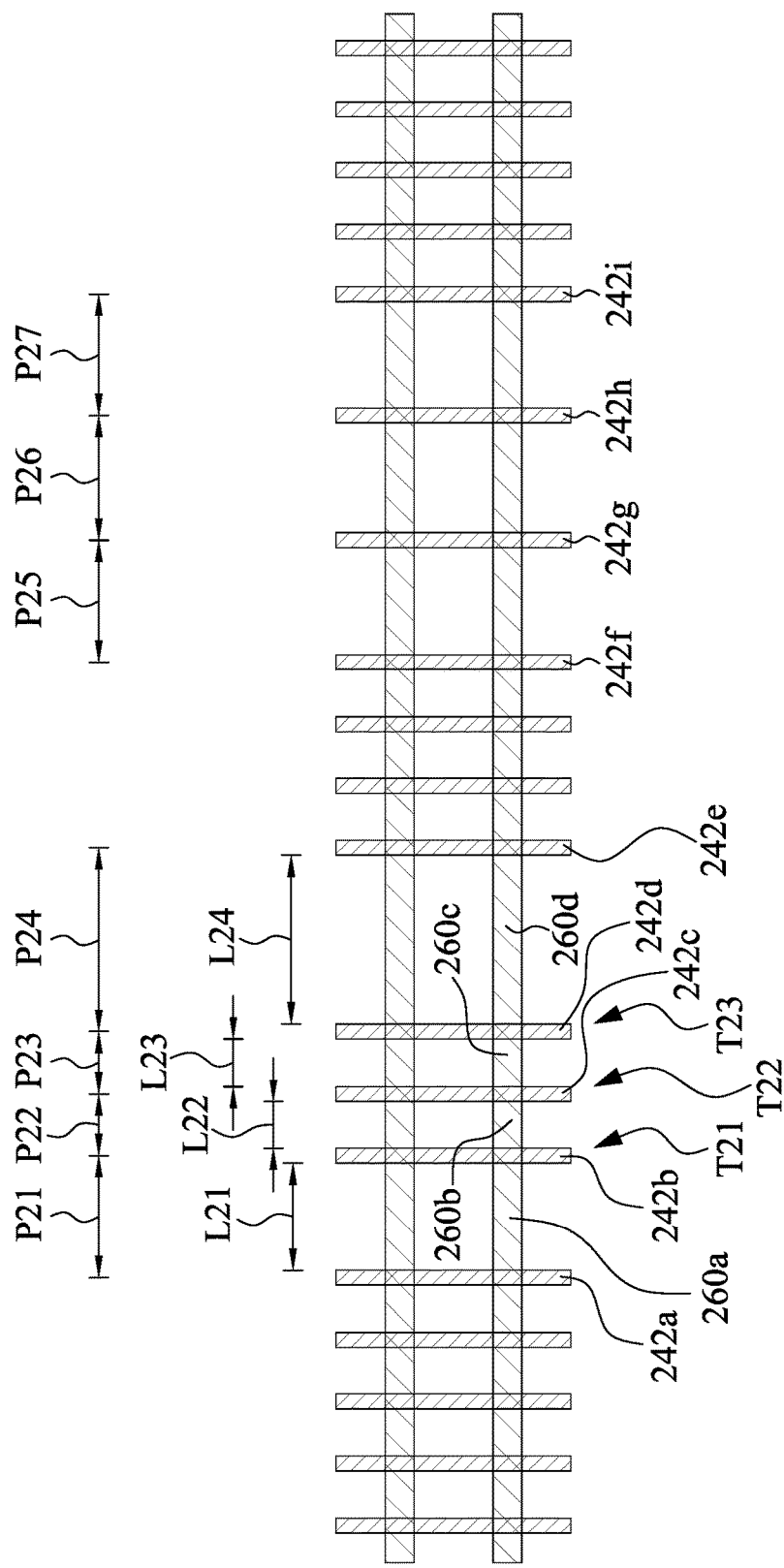
FIG. 9 is a top view of a semiconductor device in various stages according to some embodiments.

FIG. 9 is a top view of a semiconductor device 200 in various stages according to some embodiments. The difference between the semiconductor devices in FIGS. 9 and 6A pertains to the configuration of the gate structures. In FIG. 9, the semiconductor device 200 includes a plurality of gate structures and a plurality of epitaxial structures. The OD portions correspond to the epitaxial structures, and the G portions correspond to the gate structures. The gate structures are arranged in an x-direction, and the pitches of neighboring gate structures are different. For example, the neighboring gate structures 242a and 242b have a pitch P21, the neighboring gate structures 242b and 242c have a pitch P22, the neighboring gate structures 242c and 242d have a pitch P23, the neighboring gate structures 242d and 242e have a pitch P24, the neighboring gate structures 242f and 242g have a pitch P25, the neighboring gate structures 242g and 242h have a pitch P26, and the neighboring gate structures 242h and 242i have a pitch P27. The pitch P21 (or P25 or P26 or P27) is substantially twice the pitch P22 (or P23), and the pitch P24 is substantially three times the pitch P22 (or P23). That is, each of pitches of neighboring gate structures is n times of the pitch P22 (or P23), wherein n is a positive integer. Further, the gate structures have substantially the same width.

The epitaxial structures extend in the x-direction, and the lengths of the epitaxial structures may be different. For example, the epitaxial structures 260a and 260b are on opposite sides of the gate structure 242b, and the epitaxial structures 260a and 260b and the gate structure 242b form a transistor T21. The length L21 of the epitaxial structure 260a is different from the length L22 of the epitaxial structure 260b. For example, the length L21 is substantially twice the length L22. Further, the epitaxial structures 260b and 260c are on opposite sides of the gate structure 242c, and the epitaxial structures 260b and 260c and the gate structure 242c form a transistor T22. The length L22 of the epitaxial structure 260b is substantially the same as the length L23 of the epitaxial structure 260c. Moreover, the epitaxial structures 260c and 260d are on opposite sides of the gate structure 242d, and the epitaxial structures 260c and 260d and the gate structure 242d form a transistor T23. The length L23 of the epitaxial structure 260c is different from the length L24 of the epitaxial structure 260d. For example, the length L24 is substantially three times the length L23. That is, each of length of the epitaxial structures is m times of the length L22 (or L23), wherein m is a positive integer. Other relevant structural details of the semiconductor device 200 in FIG. 9 are the same as or similar to the semiconductor device in FIGS. 6A-6D (or FIGS. 7A-7D), and, therefore, a description in this regard will not be repeated hereinafter.

Figure 10:
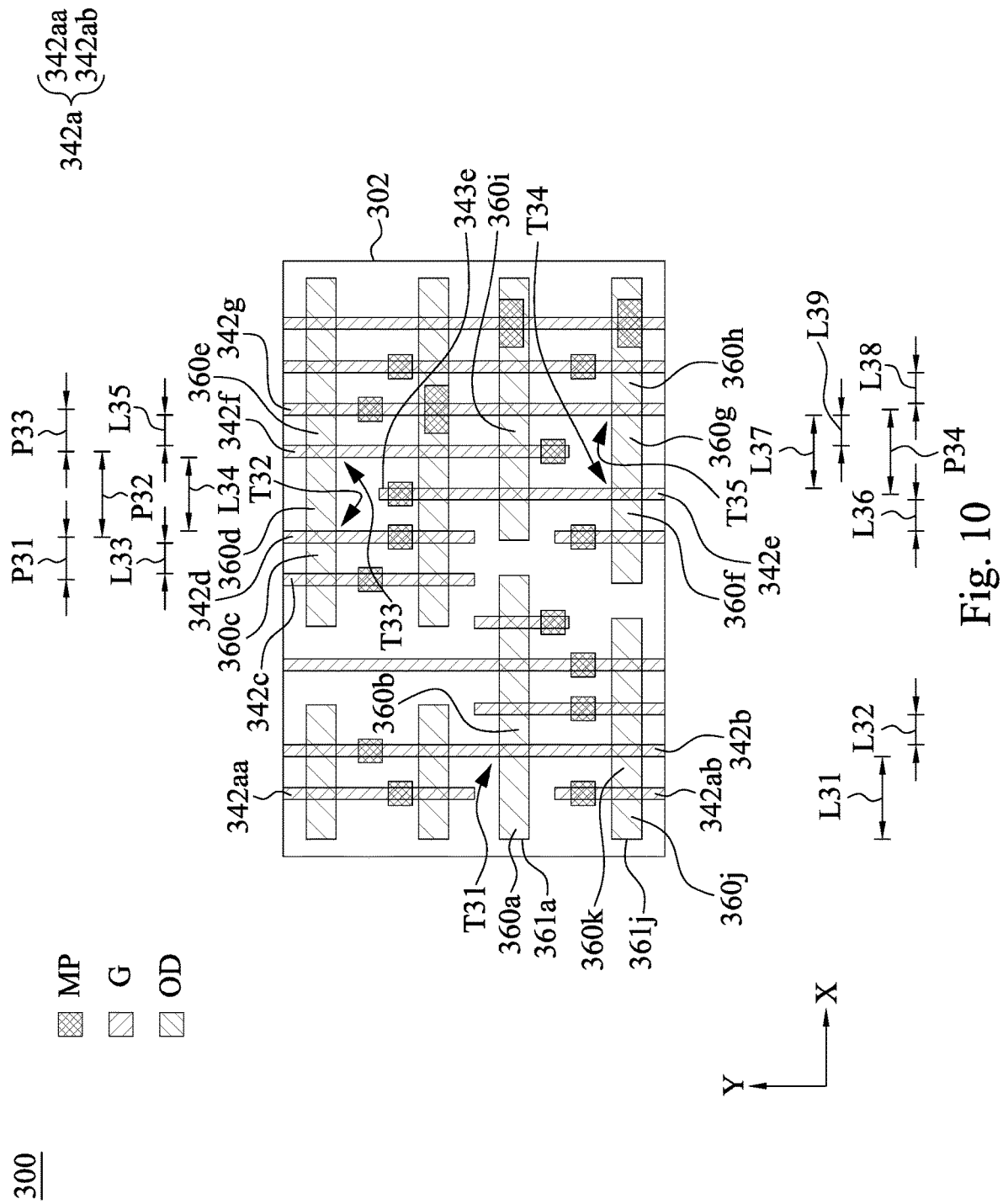
FIG. 10 is a layout diagram of an integrated circuit in accordance with some embodiments of the present disclosure.

The structure in FIG. 6A (or FIG. 7A or 9) may be applied to various integrated circuits/circuit cells to increase routing flexibility. FIG. 10 is a layout diagram of an integrated circuit 300 in accordance with some embodiments of the present disclosure. The integrated circuit 300 is an SDFQ (or SDFSNQ) circuit. The layout diagram of the integrated circuit 300 includes a plurality of active regions, a plurality of gate structures, and a plurality of conductive features. The OD portions correspond to the active regions (e.g., epitaxial structures), the G portions correspond to the gate structures, the MP portions correspond to the conductive features, and label 302 corresponds to a cell boundary of the integrated circuit 300. The conductive features are formed above the gate structures. The active regions extend in an x-direction, and the gate structures extend in a y-direction.

Portions of the gate structures are removed. For example, a portion of the gate structure 342a is removed to form gate structures 342aa and 342ab extend and arranged in the y-direction. The epitaxial structures 360a and 360b and the gate structure 342b form a transistor T31. The epitaxial structure 360a is interposed between the gate structures 342aa and 342ab. That is, the epitaxial structure 360a is between ends of the gate structures 342aa and 342ab, and the gate structure 342aa, the epitaxial structure 360a, and the gate structure 342ab are sequentially arranged in the y-direction. Further, a length L31 of the epitaxial structure 360a is substantially twice a length L32 of the epitaxial structure 360b.

The epitaxial structures 360j and 360k are on opposite sides of the gate structure 342ab. The epitaxial structures 360j and 360k have substantially the same length, which is substantially the same as the length L32 of the epitaxial structure 360b. The epitaxial structure 360j (or 360k) and the epitaxial structure 360a are arranged in the y-direction. An edge 361a of the epitaxial structure 360a is substantially aligned with an edge 361j of the epitaxial structure 360j.

Moreover, in FIG. 10, a portion of the gate structure 342e is removed. The gate structures in FIG. 10 have a constant/uniform pitch. For example, the gate structures 342c and 342d have a pitch P31, the gate structures 342d and 342f have a pitch P32 substantially twice the pitch P31, and the gate structures 342f and 342g have a pitch P33 substantially the same as the pitch P31. The epitaxial structures 360c and 360d and the gate structure 342d form a transistor T32, and the epitaxial structures 360d and 360e and the gate structure 342f form a transistor T33. That is, the transistors T32 and T33 share a common source/drain (i.e., the epitaxial structure 360d in this case). The epitaxial structure 360d is located at one end 343e of the gate structure 342e and between the gate structures 342d and 342f. A length L34 of the epitaxial structure 360d is substantially twice a length L33 of the epitaxial structure 360c, and the length L34 of the epitaxial structure 360d is substantially twice a length L35 of the epitaxial structure 360e. Moreover, the length L34 is greater than a pitch of the gate structures 342d and 342e (or a pitch of the gate structures 342e and 342f), which is substantially the same as the pitch P31 of the gate structures 342c and 342d. Further, the end 343e of the gate structure 342e is directly above the isolation structure.

Further, in FIG. 10, a portion of the gate structure 342f is removed. The gate structures 342e and 342f have a pitch P34 substantially twice the pitch P31. The epitaxial structures 360f and 360g and the gate structure 342e form a transistor T34, and the epitaxial structures 360g and 360h and the gate structure 342g form a transistor T35. That is, the transistors T34 and T35 share a common source/drain (i.e., the epitaxial structure 360g in this case). The epitaxial structure 360g is located at one end of the gate structure 342*f* and between the gate structures 342*e* and 342*g*. A length L37 of the epitaxial structure 360*g* is substantially twice a length L36 of the epitaxial structure 360*f*, and the length L37 of the epitaxial structure 360*g* is substantially twice a length L38 of the epitaxial structure 360*h*. Further, the epitaxial structure 360*i* is between the gate structures 342*f* and 342*g*, and the epitaxial structures 360*g* and 360*i* are arrange in the y-direction. A length L39 of the epitaxial structure 360*i* is less than the length L37 of the epitaxial structure 360*g*, e.g., substantially half of the length L37 of the epitaxial structure 360*g*. Other relevant structural details of the integrated circuit 300 in FIG. 10 are the same as or similar to the semiconductor device in FIGS. 6A-6D (or FIGS. 7A-7D), and, therefore, a description in this regard will not be repeated hereinafter.

Figure 11:
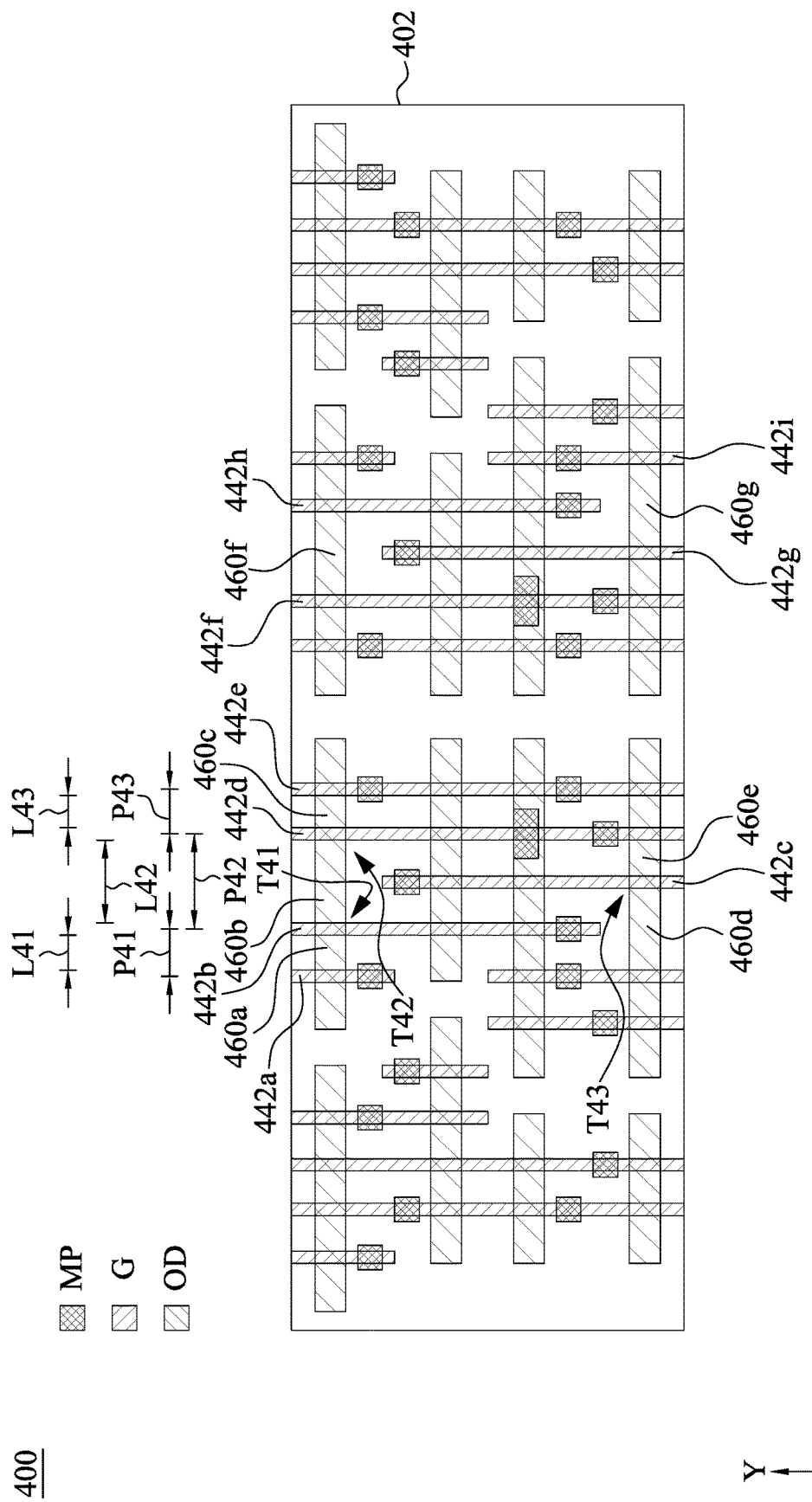
FIG. 11 is a layout diagram of an integrated circuit in accordance with some embodiments of the present disclosure.

FIG. 11 is a layout diagram of an integrated circuit 400 in accordance with some embodiments of the present disclosure. The integrated circuit 400 is an MB2SDFQ circuit. The layout diagram of the integrated circuit 400 includes a plurality of active regions, a plurality of gate structures, and a plurality of conductive features. The OD portions correspond to the active regions (e.g., epitaxial structures), the G portions correspond to the gate structures, the MP portions correspond to the conductive features, and label 402 corresponds to a cell boundary of the integrated circuit 400. The active regions extend in an x-direction, and the gate structures extend in a y-direction.

Portions of the gate structures are removed. For example, a portion of the gate structure 442*c* is removed. The gate structures in FIG. 11 have a constant/uniform pitch. For example, the gate structures 442*a* and 442*b* have a pitch P41, the gate structures 342*b* and 342*d* have a pitch P42 substantially twice the pitch P41, and the gate structures 442*d* and 442*e* have a pitch P43 substantially the same as the pitch P41. The epitaxial structures 460*a* and 460*b* and the gate structure 442*b* form a transistor T41, and the epitaxial structures 460*b* and 460*c* and the gate structure 442*d* form a transistor T42. That is, the transistors T41 and T42 share a common source/drain (i.e., the epitaxial structure 460*b* in this case). The epitaxial structure 460*b* is located at one end of the gate structure 442*c* and between the gate structures 442*b* and 442*d*. A length L42 of the epitaxial structure 460*b* is substantially twice a length L41 of the epitaxial structure 460*a*, and the length L42 of the epitaxial structure 460*b* is substantially twice a length L43 of the epitaxial structure 460*c*.

Further, in FIG. 11, a portion of the gate structure 442*b* is removed, and the epitaxial structure 460*d* is formed at one end of the gate structure 442*b*. The epitaxial structures 460*d* and 460*e* and the gate structure 442*c* form a transistor T43, and a length of the epitaxial structure 460*d* is substantially twice a length of the epitaxial structure 460*e*. Moreover, a portion of the gate structure 442*g* is removed, and the epitaxial structure 460*f* is formed at one end of the gate structure 442*g* and between the gate structures 442*f* and 442*h*. A portion of the gate structure 442*h* is removed, and the epitaxial structure 460*g* is formed at one end of the gate structure 442*h* and between the gate structures 442*g* and 442*i*. Other relevant structural details of the integrated circuit 400 in FIG. 11 are the same as or similar to the semiconductor device in FIGS. 6A-6D (or FIGS. 7A-7D), and, therefore, a description in this regard will not be repeated hereinafter.

Figure 12:
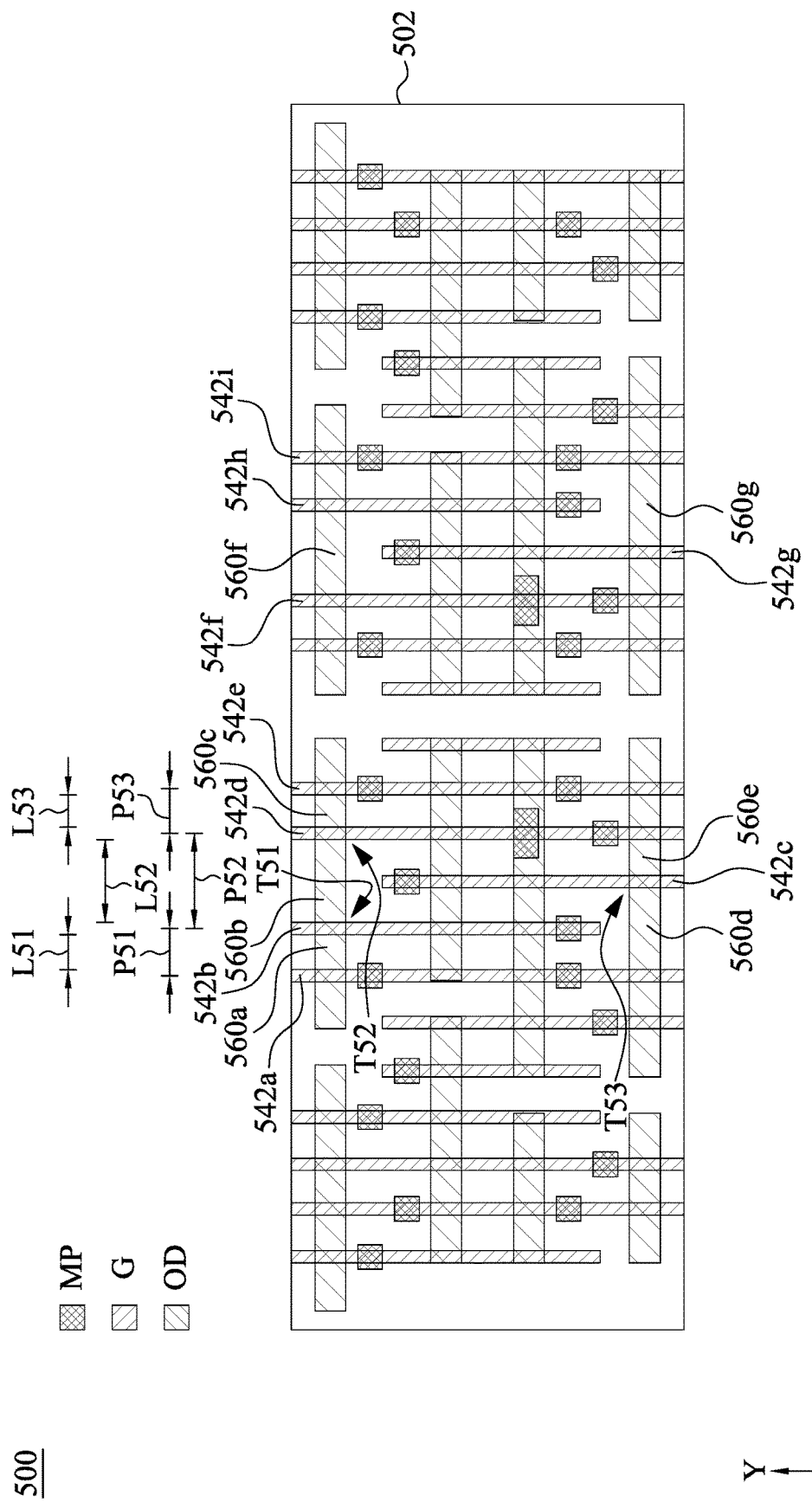
FIG. 12 is a layout diagram of an integrated circuit in accordance with some embodiments of the present disclosure.

FIG. 12 is a layout diagram of an integrated circuit 500 in accordance with some embodiments of the present disclosure. The integrated circuit 500 is an MB2SRLSDFQD1 circuit. The layout diagram of the integrated circuit 500 includes a plurality of active regions, a plurality of gate structures, and a plurality of conductive features. The OD portions correspond to the active regions (e.g., epitaxial structures), the G portions correspond to the gate structures, the MP portions correspond to the conductive features, and label 502 corresponds to a cell boundary of the integrated circuit 500. The active regions extend in an x-direction, and the gate structures extend in a y-direction.

Portions of the gate structures are removed. For example, a portion of the gate structure 542*c* is removed. The gate structures in FIG. 12 have a constant/uniform pitch. For example, the gate structures 542*a* and 542*b* have a pitch P51, the gate structures 542*b* and 542*d* have a pitch P52 substantially twice the pitch P51, and the gate structures 542*d* and 542*e* have a pitch P53 substantially the same as the pitch P51. The epitaxial structures 560*a* and 560*b* and the gate structure 542*b* form a transistor T51, and the epitaxial structures 560*b* and 560*c* and the gate structure 542*d* form a transistor T52. That is, the transistors T51 and T52 share a common source/drain (i.e., the epitaxial structure 560*b* in this case). The epitaxial structure 560*b* is located at one end of the gate structure 542*c* and between the gate structures 542*b* and 542*d*. A length L52 of the epitaxial structure 560*b* is substantially twice a length L51 of the epitaxial structure 560*a*, and the length L52 of the epitaxial structure 560*b* is substantially twice a length L53 of the epitaxial structure 560*c*.

Further, in FIG. 12, a portion of the gate structure 542*b* is removed, and the epitaxial structure 560*d* is formed at one end of the gate structure 542*b*. The epitaxial structures 560*d* and 560*e* and the gate structure 542*c* form a transistor T53, and a length of the epitaxial structure 560*d* is substantially twice a length of the epitaxial structure 560*e*. Moreover, a portion of the gate structure 542*g* is removed, and the epitaxial structure 560*f* is formed at one end of the gate structure 542*g* and between the gate structures 542*f* and 542*h*. A portion of the gate structure 542*h* is removed, and the epitaxial structure 560*g* is formed at one end of the gate structure 542*h* and between the gate structures 542*g* and 542*i*. Other relevant structural details of the integrated circuit 500 in FIG. 12 are the same as or similar to the semiconductor device in FIGS. 6A-6D (or FIGS. 7A-7D), and, therefore, a description in this regard will not be repeated hereinafter.

Figure 13:
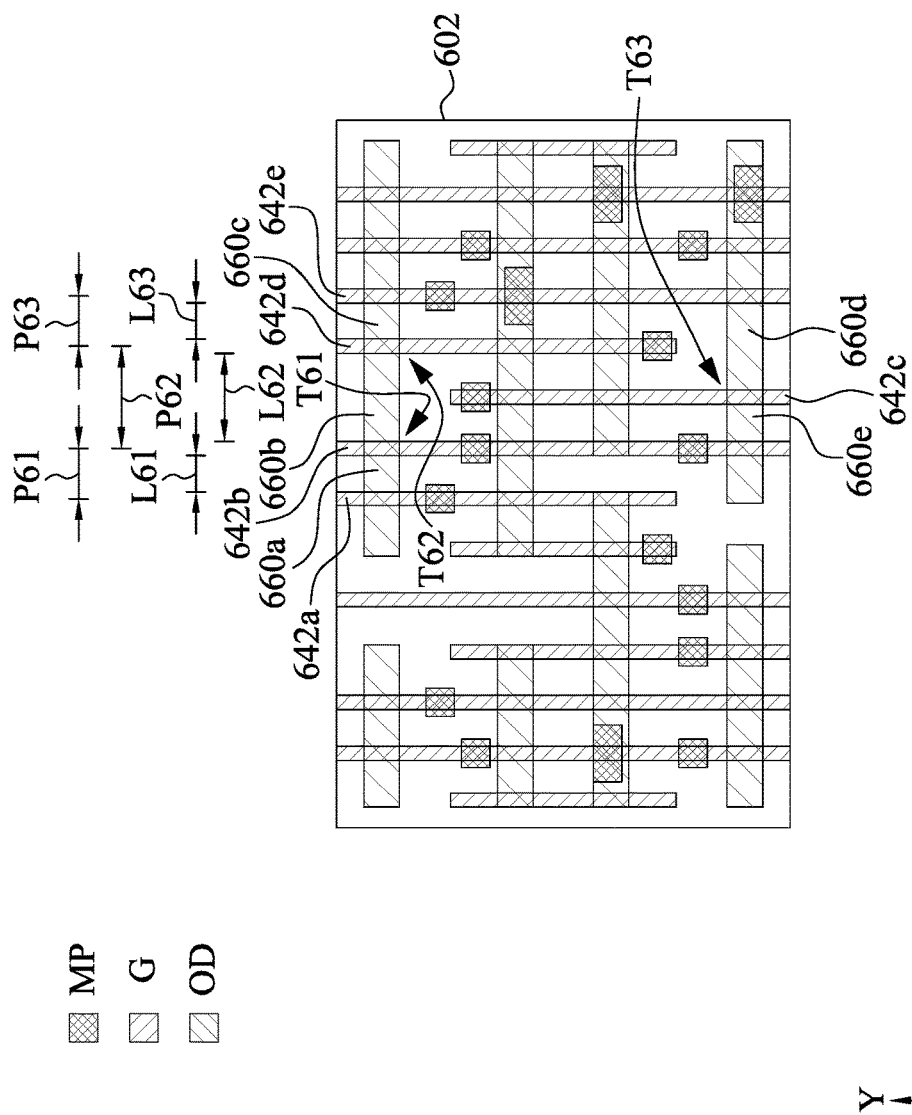
FIG. 13 is a layout diagram of an integrated circuit in accordance with some embodiments of the present disclosure.

FIG. 13 is a layout diagram of an integrated circuit 600 in accordance with some embodiments of the present disclosure. The integrated circuit 600 is an SDFQD1 circuit. The layout diagram of the integrated circuit 600 includes a plurality of active regions, a plurality of gate structures, and a plurality of conductive features. The OD portions correspond to the active regions (e.g., epitaxial structures), the G portions correspond to the gate structures, the MP portions correspond to the conductive features, and label 602 corresponds to a cell boundary of the integrated circuit 600. The active regions extend in an x-direction, and the gate structures extend in a y-direction.

Portions of the gate structures are removed. For example, a portion of the gate structure 642*c* is removed. The gate structures in FIG. 13 have a constant/uniform pitch. For example, the gate structures 642*a* and 642*b* have a pitch P61, the gate structures 642*b* and 642*d* have a pitch P62 substantially twice the pitch P61, and the gate structures 642*d* and 642*e* have a pitch P63 substantially the same as the pitch P61. The epitaxial structures 660*a* and 660*b* and the gate structure 642*b* form a transistor T61, and the epitaxial structures 660*b* and 660*c* and the gate structure 642*d* form a transistor T62. That is, the transistors T61 and T62 share a common source/drain (i.e., the epitaxial structure 660*b* in this case). The epitaxial structure 660*b* is located at one end of the gate structure 642*c* and between the gate structures 642*b* and 642*d*. A length L62 of the epitaxial structure 660*b* is substantially twice a length L61 of the epitaxial structure 660*a*, and the length L62 of the epitaxial structure 660*b* is substantially twice a length L63 of the epitaxial structure 660*c*.

Further, in FIG. 13, a portion of the gate structure 642*d* is removed, and the epitaxial structure 660*d* is formed at one end of the gate structure 642*d*. The epitaxial structures 660*d* and 660*e* and the gate structure 642*c* form a transistor T63, and a length of the epitaxial structure 660*d* is substantially twice a length of the epitaxial structure 660*e*. Other relevant structural details of the integrated circuit 600 in FIG. 13 are the same as or similar to the semiconductor device in FIGS. 6A-6D (or FIGS. 7A-7D), and, therefore, a description in this regard will not be repeated hereinafter.

Figure 14:
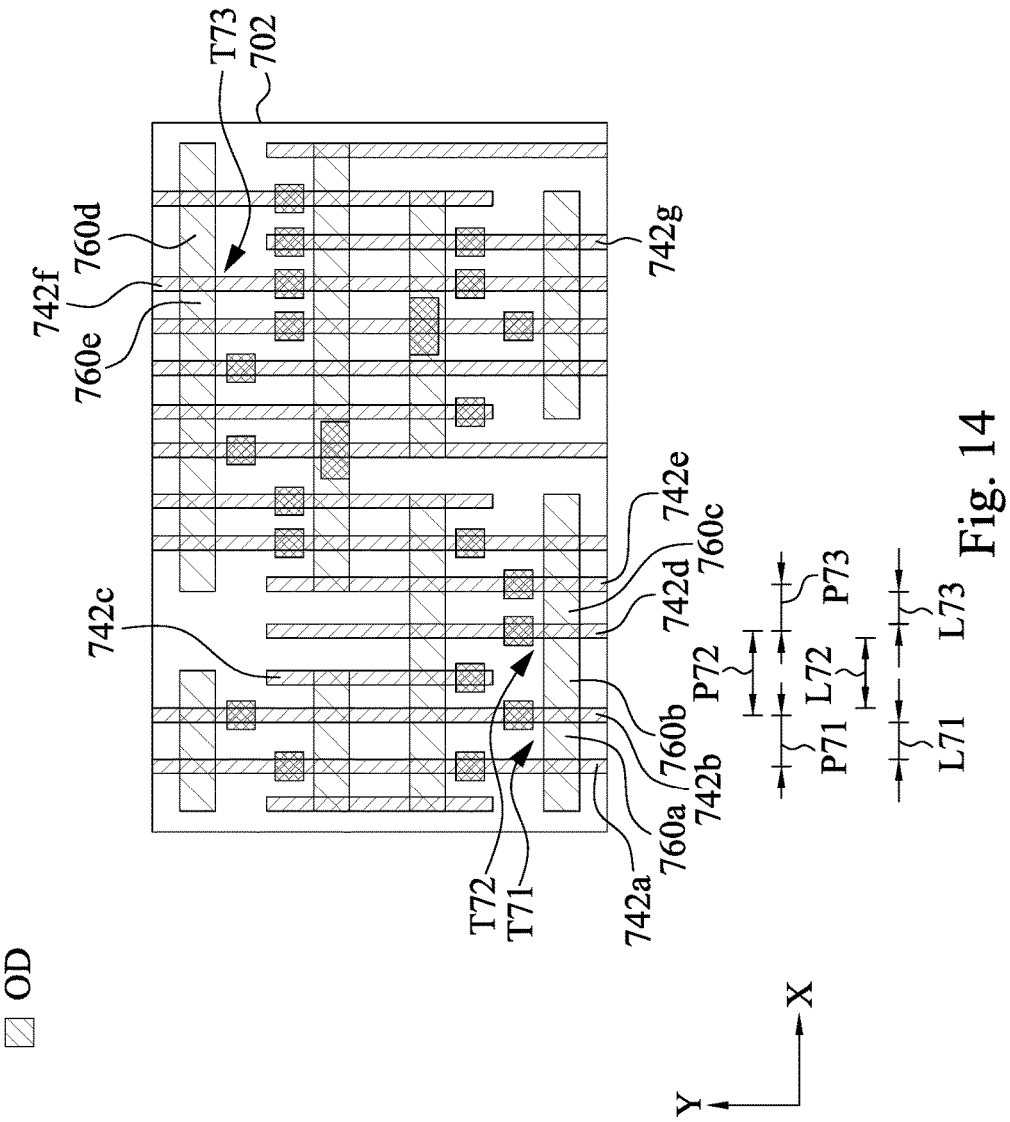
FIG. 14 is a layout diagram of an integrated circuit in accordance with some embodiments of the present disclosure.

FIG. 14 is a layout diagram of an integrated circuit 700 in accordance with some embodiments of the present disclosure. The integrated circuit 700 is an SDFSNQD1 circuit. The layout diagram of the integrated circuit 700 includes a plurality of active regions, a plurality of gate structures, and a plurality of conductive features. The OD portions correspond to the active regions (e.g., epitaxial structures), the G portions correspond to the gate structures, the MP portions correspond to the conductive features, and label 702 corresponds to a cell boundary of the integrated circuit 700. The active regions extend in an x-direction, and the gate structures extend in a y-direction.

Portions of the gate structures are removed. For example, a portion of the gate structure 742*c* is removed. The gate structures in FIG. 14 have a constant/uniform pitch. For example, the gate structures 742*a* and 742*b* have a pitch P71, the gate structures 742*b* and 742*d* have a pitch P72 substantially twice the pitch P71, and the gate structures 742*d* and 742*e* have a pitch P73 substantially the same as the pitch P71. The epitaxial structures 760*a* and 760*b* and the gate structure 742*b* form a transistor T71, and the epitaxial structures 760*b* and 760*c* and the gate structure 742*d* form a transistor T72. That is, the transistors T71 and T72 share a common source/drain (i.e., the epitaxial structure 760*b* in this case). The epitaxial structure 760*b* is located at one end of the gate structure 742*c* and between the gate structures 742*b* and 742*d*. A length L72 of the epitaxial structure 760*b* is substantially twice a length L71 of the epitaxial structure 760*a*, and the length L72 of the epitaxial structure 760*b* is substantially twice a length L73 of the epitaxial structure 760*c*. Moreover, a portion of the gate structure 742*e* is removed as well.

Further, in FIG. 14, a portion of the gate structure 742*g* is removed, and the epitaxial structure 760*d* is formed at one end of the gate structure 742*g*. The epitaxial structures 760*d* and 760*e* and the gate structure 742*f* form a transistor T73, and a length of the epitaxial structure 760*d* is substantially twice a length of the epitaxial structure 760*e*. Other relevant structural details of the integrated circuit 700 in FIG. 14 are the same as or similar to the semiconductor device in FIGS. 6A-6D (or FIGS. 7A-7D), and, therefore, a description in this regard will not be repeated hereinafter.

Figure 15:
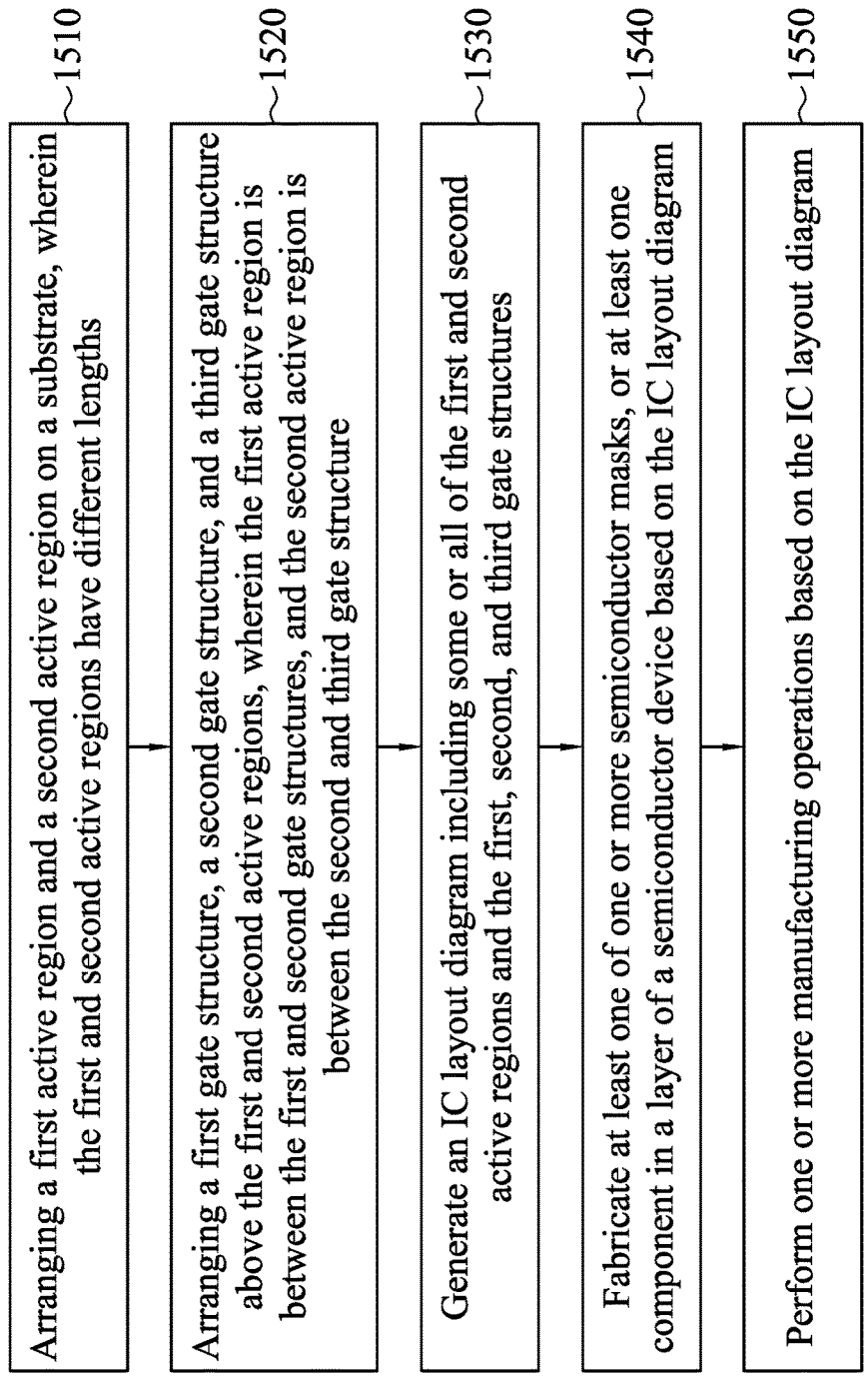
FIG. 15 is a flowchart of a method of generating an IC layout diagram, in accordance with some embodiments of the present disclosure.

FIG. 15 is a flowchart of a method 1500 of generating an IC layout diagram, in accordance with some embodiments of the present disclosure. In some embodiments, generating an IC layout diagram includes generating one of layout diagrams of the semiconductor device 200, the integrated circuits 300, 400, 500, 600, or 700 discussed above with respect to FIGS. 9-14, manufactured based on the generated IC layout diagram. In some embodiments, generating the IC layout diagram is part of operating an IC manufacturing system as part of manufacturing an IC device, e.g., a memory circuit, logic device, processing device, signal processing circuit, or the like.

In some embodiments, some or all of method 1500 is executed by a processor of a computer. In some embodiments, some or all of method 1500 is executed by a processor 1602 of an IC device design system 1600, discussed below with respect to FIG. 16. Some or all of the operations of method 1500 are capable of being performed as part of a design procedure performed in a design house, e.g., design house 1720 discussed below with respect to FIG. 17.

In some embodiments, the operations of method 1500 are performed in the order depicted in FIG. 15. In some embodiments, the operations of method 1500 are performed simultaneously and/or in an order other than the order depicted in FIG. 15. In some embodiments, one or more operations are performed before, between, during, and/or after performing one or more operations of method 1500.

At operation 1510, a first active region and a second active region are arranged on a substrate, wherein the first and second active regions have different lengths. Arranging the first and second active regions includes arranging the active regions corresponding to the epitaxial structures 160*c* and 160*b* discussed above with respect to FIGS. 5A-7D. In various embodiments, arranging the active regions includes arranging the epitaxial structures 165*c* and 165*b* discussed above with respect to FIGS. 5A-7D, arranging the epitaxial structures 260*a* and 260*b* discussed above with respect to FIG. 9, arranging the epitaxial structures 360*a* and 360*b* discussed above with respect to FIG. 10, arranging the epitaxial structures 460*b* and 460*c* discussed above with respect to FIG. 11, arranging the epitaxial structures 560*b* and 560*c* discussed above with respect to FIG. 12, arranging the epitaxial structures 660*b* and 660*c* discussed above with respect to FIG. 13, and arranging the epitaxial structures 760*b* and 760*c* discussed above with respect to FIG. 14.

At operation 1520, a first gate structure, a second gate structure, and a third gate structure are arranged above the first and second active regions, wherein the first active region is between the first and second gate structures, and the second active region is between the second and third gate structure. Arranging the first, second, and third gate structures includes arranging the first, second, and third gate structures corresponding to the gate structures 142*b*, 142*d*, and 142*e* discussed above with respect to FIGS. 5A-7D. In various embodiments, arranging the first, second, and third gate structures includes arranging the gate structures 242*a*, 242*b*, and 242*c* discussed above with respect to FIG. 9, arranging the gate structures 242*e*, 242*d*, and 242*c* discussed above with respect to FIG. 9, arranging the gate structures 342*d*, 342*f*, and 342*g* discussed above with respect to FIG. 10, arranging the gate structures 442*b*, 442*d*, and 442*e* discussed above with respect to FIG. 11, arranging the gate structures 542*b*, 542*d*, and 542*e* discussed above with respect to FIG. 12, arranging the gate structures 642*b*, 642*d*, and 642*e* discussed above with respect to FIG. 13, and arranging the gate structures 742*b*, 742*d*, and 742*e* discussed above with respect to FIG. 14.

At operation 1530, in some embodiments, an IC layout diagram is generated. The IC layout diagram includes the first gate structures, the second gate structure, the source/drain regions, and the body regions arranged as discussed above with respect to operations 1510-1520. In some embodiment, generating the IC layout diagram includes storing the IC layout diagram in a storage device. In various embodiments, storing the IC layout diagram in the storage device includes storing the IC layout diagram in a non-volatile, computer-readable memory or a cell library, e.g., a database, and/or includes storing the IC layout diagram over a network. In some embodiments, storing the IC layout diagram in the storage device includes storing the IC layout diagram over network 1614 of IC device design system 1600, discussed below with respect to FIG. 16.

At operation 1540, in some embodiments, at least one of one or more semiconductor masks, or at least one component in a layer of a semiconductor device is fabricated based on the IC layout diagram. Fabricating one or more semiconductor masks or at least one component in a layer of a semiconductor device is discussed below with respect to FIG. 17.

At operation 1550, in some embodiments, one or more manufacturing operations are performed based on the IC layout diagram. In some embodiments, performing one or more manufacturing operations includes performing one or more lithographic exposures based on the IC layout diagram. Performing one or more manufacturing operations, e.g., one or more lithographic exposures, based on the IC layout diagram is discussed below with respect to FIG. 17.

By executing some or all of the operations of method 1500, an IC layout diagram and corresponding semiconductor device, e.g., as discussed above with respect to FIGS. 1A-7D and 9-14, are generated in which the various embodiments include cut gate structures, thereby improving the metal routing resources of the semiconductor device.

Figure 16:
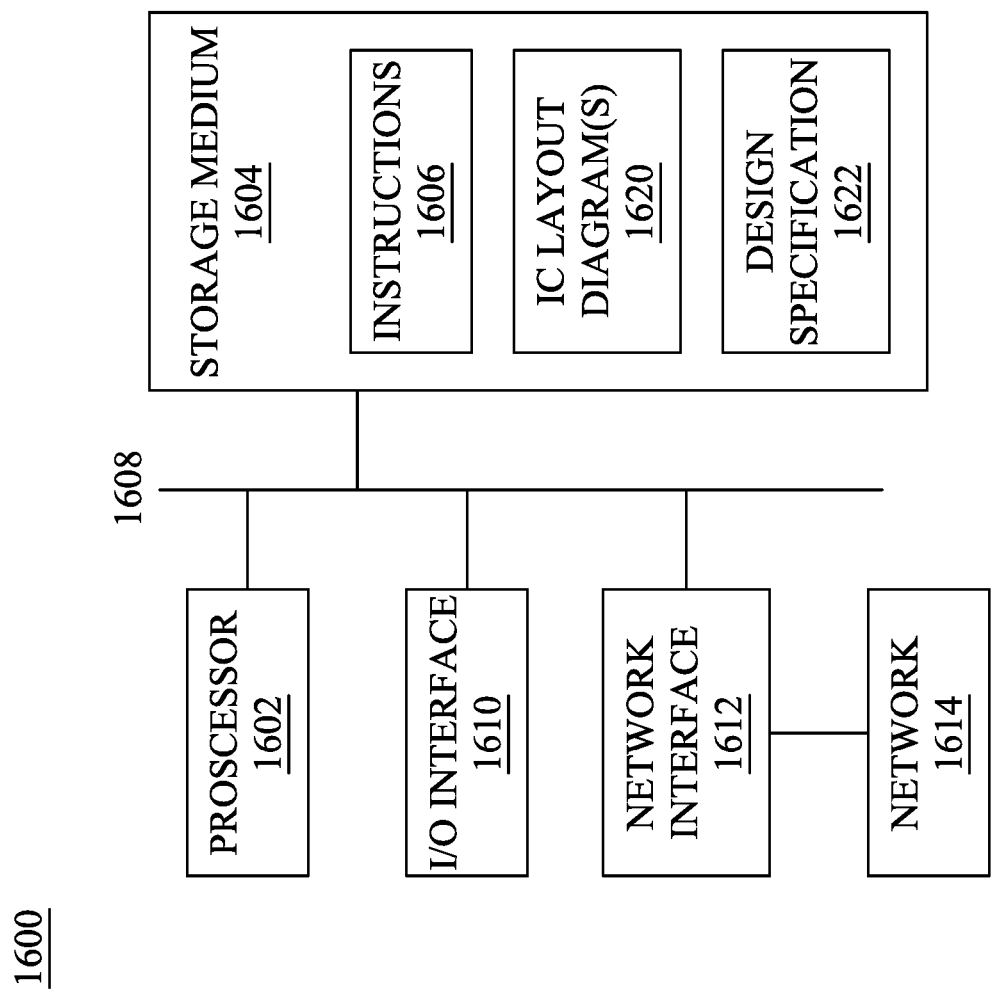
FIG. 16 is a block diagram of an IC device design system, in accordance with some embodiments of the present disclosure.

FIG. 16 is a block diagram of an IC device design system 1600, in accordance with some embodiments of the present disclosure. One or more operations of method 1500 as discussed above with respect to FIG. 15, are implementable using the IC device design system 1600, in accordance with some embodiments.

In some embodiments, IC device design system 1600 is a computing device including a hardware processor 1602 and a non-transitory computer-readable storage medium 1604. Non-transitory computer-readable storage medium 1604, amongst other things, is encoded with, i.e., stores, computer program codes, i.e., a set of executable instructions 1606. Execution of instructions 1606 by the hardware processor 1602 represents (at least in part) an IC device design system which implements a portion or all of, e.g., method 1500 discussed above with respect to FIG. 15 (hereinafter, the noted processes and/or methods).

Processor 1602 is electrically coupled to non-transitory computer-readable storage medium 1604 via a bus 1608. Processor 1602 is also electrically coupled to an I/O interface 1610 by bus 1608. A network interface 1612 is also electrically connected to processor 1602 via bus 1608. Network interface 1612 is connected to a network 1614, so that processor 1602 and non-transitory, computer-readable storage medium 1604 are capable of being connected to external elements via network 1614. Processor 1602 is configured to execute the instructions 1606 encoded in non-transitory computer-readable storage medium 1604 in order to cause IC device design system 1600 to be usable for performing a portion or all of the noted processes and/or methods. In one or more embodiments, processor 1602 is a central processing unit (CPU), a multi-processor, a distributed processing system, an application specific IC (ASIC), and/or a suitable processing unit.

In one or more embodiments, non-transitory computer-readable storage medium 1604 is an electronic, magnetic, optical, electromagnetic, infrared, and/or a semiconductor system (or apparatus or device). For example, non-transitory computer-readable storage medium 1604 includes a semiconductor or solid-state memory, a magnetic tape, a removable computer diskette, a random access memory (RAM), a read-only memory (ROM), a rigid magnetic disk, and/or an optical disk. In one or more embodiments using optical disks, non-transitory computer-readable storage medium 1604 includes a compact disk-read only memory (CD-ROM), a compact disk-read/write (CD-R/W), and/or a digital video disc (DVD).

In one or more embodiments, non-transitory computer-readable storage medium 1604 stores the instructions 1606 configured to cause IC device design system 1600 to be usable for performing a portion or all of the noted processes and/or methods. In one or more embodiments, non-transitory computer-readable storage medium 1604 also stores information which facilitates performing a portion or all of the noted processes and/or methods. In various embodiments, non-transitory computer-readable storage medium 1604 stores one or a combination of at least one IC layout design diagram 1620 or at least one design specification 1622, each discussed above with respect to FIGS. 1A-7D and 9-14.

IC device design system 1600 includes I/O interface 1610. I/O interface 1610 is coupled to external circuitry. In various embodiments, I/O interface 1610 includes one or a combination of a keyboard, keypad, mouse, trackball, trackpad, display, touchscreen, and/or cursor direction keys for communicating information and commands to and/or from processor 1602.

IC device design system 1600 also includes network interface 1612 coupled to processor 1602. Network interface 1612 allows IC device design system 1600 to communicate with network 1614, to which one or more other computer systems are connected. Network interface 1612 includes wireless network interfaces such as BLUETOOTH, WIFI, WIMAX, GPRS, or WCDMA; or wired network interfaces such as ETHERNET, USB, or IEEE-1364. In one or more embodiments, a portion or all of the noted processes and/or methods, is implemented in two or more systems 1600.

IC device design system 1600 is configured to receive information through I/O interface 1610. The information received through I/O interface 1610 includes one or a combination of at least one design rule instructions, at least one set of criteria, at least one design rule, at least one DRM, and/or other parameters for processing by processor 1602. The information is transferred to processor 1602 via bus 1608. IC device design system 1600 is configured to transmit and/or receive information related to a user interface through I/O interface 1610.

In some embodiments, a portion or all of the noted processes and/or methods is implemented as a standalone software application for execution by a processor. In some embodiments, a portion or all of the noted processes and/or methods is implemented as a software application that is a part of an additional software application. In some embodiments, a portion or all of the noted processes and/or methods is implemented as a plug-in to a software application. In some embodiments, at least one of the noted processes and/or methods is implemented as a software application that is a portion of an EDA tool. In some embodiments, an IC layout diagram is generated using a tool such as VIRTUOSO® available from CADENCE DESIGN SYSTEMS, Inc., or another suitable layout generating tool.

In some embodiments, the processes are realized as functions of a program stored in a non-transitory computer-readable recording medium. Examples of a non-transitory computer-readable recording medium include, but are not limited to, external/removable and/or internal/built-in storage or memory unit, e.g., one or more of an optical disk, such as a DVD, a magnetic disk, such as a hard disk, a semiconductor memory, such as a ROM, a RAM, a memory card, and the like.

By being usable to implement one or more operations of method 1500 of FIG. 15, IC device design system 1600 and a non-transitory computer-readable storage medium, e.g., non-transitory computer-readable storage medium 1604, enable the benefits discussed above with respect to method 1500 and FIG. 15.

Figure 17:
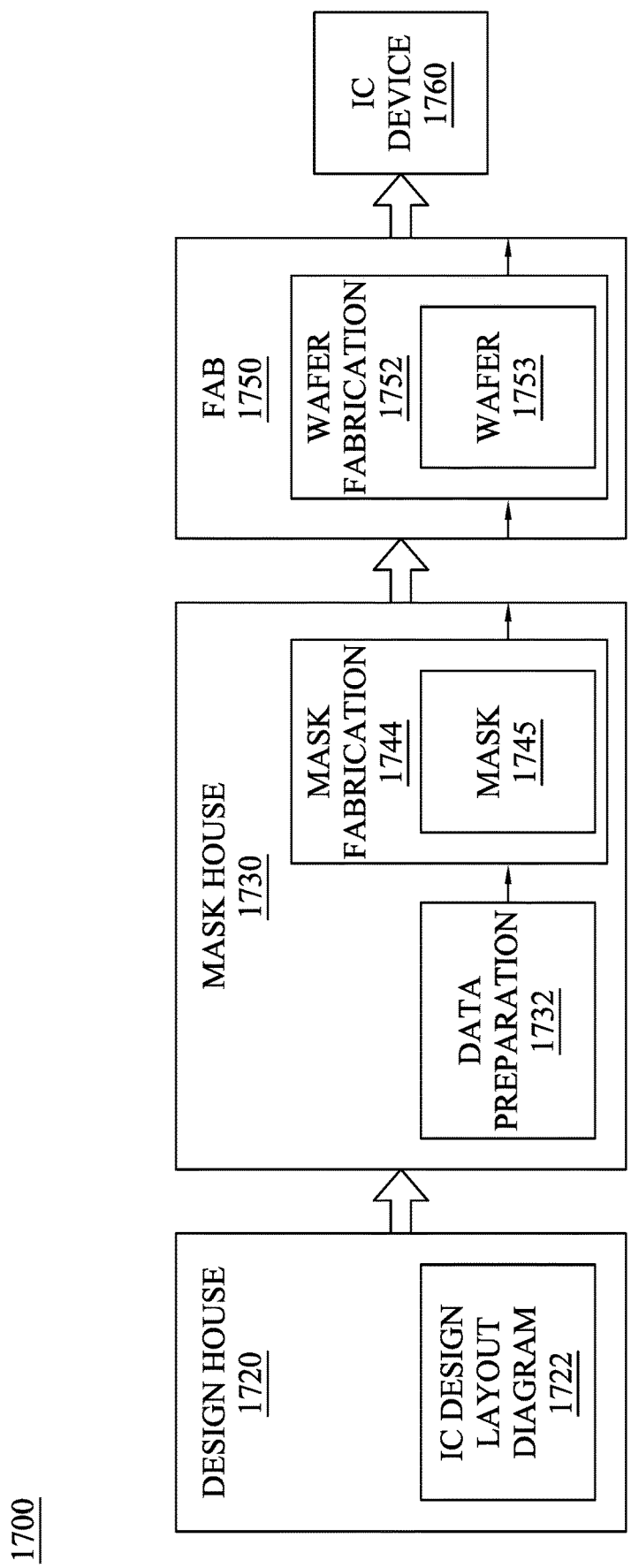
FIG. 17 is a block diagram of IC manufacturing system 1700, and an IC manufacturing flow associated therewith, in accordance with some embodiments of the present disclosure.

FIG. 17 is a block diagram of IC manufacturing system 1700, and an IC manufacturing flow associated therewith, in accordance with some embodiments of the present disclosure. In some embodiments, based on a layout design, at least one of (A) one or more semiconductor masks or (B) at least one component in a layer of a semiconductor IC is fabricated using the IC manufacturing system 1700.

In FIG. 17, the IC manufacturing system 1700 includes entities, such as a design house 1720, a mask house 1730, and an IC manufacturer/fabricator ("fab") 1750, that interact with one another in the design, development, and manufacturing cycles and/or services related to manufacturing an IC device 1760. The entities in system 1700 are connected by a communications network. In some embodiments, the communications network is a single network. In some embodiments, the communications network is a variety of different networks, such as an intranet and the Internet. The communications network includes wired and/or wireless communication channels. Each entity interacts with one or more of the other entities and provides services to and/or receives services from one or more of the other entities. In some embodiments, two or more of design house 1720, mask house 1730, and IC fab 1750 is owned by a single larger company. In some embodiments, two or more of design house 1720, mask house 1730, and IC fab 1750 coexist in a common facility and use common resources.

Design house (or design team) 1720 generates an IC design layout diagram (or design) 1722 based on method 1500 of FIG. 15 and discussed above with respect to FIGS. 1A-7D and 9-14. IC design layout diagram 1722 includes various geometrical patterns that correspond to patterns of metal, oxide, or semiconductor layers that make up the various components of IC device 1760 to be fabricated. The various layers combine to form various IC features. For example, a portion of IC design layout diagram 1722 includes various IC features, such as an active region, gate electrode, source and drain, metal lines or vias of an interlayer interconnection, and openings for bonding pads, to be formed in a semiconductor substrate (such as a silicon wafer) and various material layers disposed on the semiconductor substrate. Design house 1720 implements a proper design procedure including method 1500 of FIG. 15 and discussed above with respect to FIGS. 1A-7D and 9-14, to form IC design layout diagram 1722. The design procedure includes one or more of logic design, physical design or place and route. IC design layout diagram 1722 is presented in one or more data files having information of the geometrical patterns. For example, IC design layout diagram 1722 can be expressed in a GDSII file format or DFII file format.

Mask house 1730 includes data preparation 1732 and mask fabrication 1744. Mask house 1730 uses IC design layout diagram 1722 to manufacture one or more masks 1745 to be used for fabricating the various layers of IC device 1760 according to IC design layout diagram 1722. Mask house 1730 performs mask data preparation 1732, where IC design layout diagram 1722 is translated into a representative data file ("RDF"). Mask data preparation 1732 provides the RDF to mask fabrication 1744. Mask fabrication 1744 includes a mask writer. A mask writer converts the RDF to an image on a substrate, such as a mask (reticle) 1745 or a semiconductor wafer 1753. The design layout diagram 1722 is manipulated by mask data preparation 1732 to comply with particular characteristics of the mask writer and/or requirements of IC fab 1750. In FIG. 17, mask data preparation 1732 and mask fabrication 1744 are illustrated as separate elements. In some embodiments, mask data preparation 1732 and mask fabrication 1744 are collectively referred to as mask data preparation.

In some embodiments, mask data preparation 1732 includes optical proximity correction (OPC) which uses lithography enhancement techniques to compensate for image errors, such as those that can arise from diffraction, interference, other process effects and the like. OPC adjusts IC design layout diagram 1722. In some embodiments, mask data preparation 1732 includes further resolution enhancement techniques (RET), such as off-axis illumination, sub-resolution assist features, phase-shifting masks, other suitable techniques, and the like or combinations thereof. In some embodiments, inverse lithography technology (ILT) is also used, which treats OPC as an inverse imaging problem.

In some embodiments, mask data preparation 1732 includes a mask rule checker (MRC) that checks the IC design layout diagram 1722 that has undergone processes in OPC with a set of mask creation rules which contain certain geometric and/or connectivity restrictions to ensure sufficient margins, to account for variability in semiconductor manufacturing processes, and the like. In some embodiments, the MRC modifies the IC design layout diagram 1722 to compensate for limitations during mask fabrication 1744, which may undo part of the modifications performed by OPC in order to meet mask creation rules.

In some embodiments, mask data preparation 1732 includes lithography process checking (LPC) that simulates processing that will be implemented by IC fab 1750 to fabricate IC device 1760. LPC simulates this processing based on IC design layout diagram 1722 to create a simulated manufactured device, such as IC device 1760. The processing parameters in LPC simulation can include parameters associated with various processes of the IC manufacturing cycle, parameters associated with tools used for manufacturing the IC, and/or other aspects of the manufacturing process. LPC takes into account various factors, such as aerial image contrast, depth of focus ("DOF"), mask error enhancement factor ("MEEF"), other suitable factors, and the like or combinations thereof. In some embodiments, after a simulated manufactured device has been created by LPC, if the simulated device is not close enough in shape to satisfy design rules, OPC and/or MRC are be repeated to further refine IC design layout diagram 1722.

It should be understood that the above description of mask data preparation 1732 has been simplified for the purposes of clarity. In some embodiments, data preparation 1732 includes additional features such as a logic operation (LOP) to modify the IC design layout diagram 1722 according to manufacturing rules. Additionally, the processes applied to IC design layout diagram 1722 during data preparation 1732 may be executed in a variety of different orders.

After mask data preparation 1732 and during mask fabrication 1744, a mask 1745 or a group of masks 1745 are fabricated based on the modified IC design layout diagram 1722. In some embodiments, mask fabrication 1744 includes performing one or more lithographic exposures based on IC design layout diagram 1722. In some embodiments, an electron-beam (e-beam) or a mechanism of multiple e-beams is used to form a pattern on a mask (photomask or reticle) 1745 based on the modified IC design layout diagram 1722. Mask 1745 can be formed in various technologies. In some embodiments, mask 1745 is formed using binary technology. In some embodiments, a mask pattern includes opaque regions and transparent regions. A radiation beam, such as an ultraviolet (UV) beam, used to expose the image sensitive material layer (e.g., photoresist) which has been coated on a wafer, is blocked by the opaque region and transmits through the transparent regions. In one example, a binary mask version of mask 1745 includes a transparent substrate (e.g., fused quartz) and an opaque material (e.g., chromium) coated in the opaque regions of the binary mask. In another example, mask 1745 is formed using a phase shift technology. In a phase shift mask (PSM) version of mask 1745, various features in the pattern formed on the phase shift mask are configured to have proper phase difference to enhance the resolution and imaging quality. In various examples, the phase shift mask can be attenuated PSM or alternating PSM. The mask(s) generated by mask fabrication 1744 is used in a variety of processes. For example, such a mask(s) is used in an ion implantation process to form various doped regions in semiconductor wafer 1753, in an etching process to form various etching regions in semiconductor wafer 1753, and/or in other suitable processes.

IC fab 1750 includes wafer fabrication 1752. IC fab 1750 is an IC fabrication business that includes one or more manufacturing facilities for the fabrication of a variety of different IC products. In some embodiments, IC Fab 1750 is a semiconductor foundry. For example, there may be a manufacturing facility for the front end fabrication of a plurality of IC products (front-end-of-line (FEOL) fabrication), while a second manufacturing facility may provide the back end fabrication for the interconnection and packaging of the IC products (back-end-of-line (BEOL) fabrication), and a third manufacturing facility may provide other services for the foundry business.

IC fab 1750 uses mask(s) 1745 fabricated by mask house 1730 to fabricate IC device 1760. Thus, IC fab 1750 at least indirectly uses IC design layout diagram 1722 to fabricate IC device 1760. In some embodiments, semiconductor wafer 1753 is fabricated by IC fab 1750 using mask(s) 1745 to form IC device 1760. In some embodiments, the IC fabrication includes performing one or more lithographic exposures based at least indirectly on IC design layout diagram 1722. Semiconductor wafer 1753 includes a silicon substrate or other proper substrate having material layers formed thereon. Semiconductor wafer 1753 further includes one or more of various doped regions, dielectric features, multi-level interconnects, and the like (formed at subsequent manufacturing steps).

Based on the above discussions, it can be seen that the present disclosure offers advantages. It is understood, however, that other embodiments may offer additional advantages, and not all advantages are necessarily disclosed herein, and that no particular advantages are required for all embodiments. One advantage is that since dummy gates are removed, additional conductive traces and/or vias above the dummy gates can be omitted, and metal routing resource in compact layout structure can be effectively saved. Another advantage is that the power consuming for grounding the dummy gates is reduced since the dummy gates are removed. Furthermore, the removal of the dummy gates also reduces the parasitic capacitance between gate structures.

According to some embodiments, a semiconductor device includes a substrate, a first gate structure, a second gate structure, a third gate structure, and a first source/drain region. The first, second, and third gate structures are above the substrate and arranged in a first direction. The first, second, and third gate structures extend in a second direction different from the first direction, and the second gate structure is between the first and third gate structures. The first source/drain region is between the first and third gate structures, and the first source/drain region is at one end of the second gate structure.

According to some embodiments, a semiconductor device includes a first semiconductor fin, a second semiconductor fin, a first gate structure, a second gate structure, a first epitaxial structure, and a second epitaxial structure. The first gate structure crosses over the first and second semiconductor fins. The second gate structure crosses over the second semiconductor fin and is spaced apart from the first semiconductor fin. The first epitaxial structure and the second epitaxial structure are above the first semiconductor fin and on opposite sides of the first gate structure. The first and second epitaxial structures have different lengths.

According to some embodiments, a method for manufacturing a semiconductor device includes forming an active region above a substrate. Gate structures are formed above the substrate and crossing over the active region. The gate structures have a substantially constant pitch. A portion of at least one of the gate structures is removed to expose a portion of the active region. A first epitaxial structure is formed at least on the exposed portion of the active region.

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:

1. A semiconductor device comprising:
   a substrate;
   a first gate structure, a second gate structure, and a third gate structure above the substrate and arranged in a first direction, wherein the first, second, and third gate structures extend in a second direction different from the first direction, and the second gate structure is between the first and third gate structures; and
   a first source/drain region extending from the first gate structure to the third gate structure, wherein the first source/drain region is at a first end of the second gate structure, and the first source/drain region is spaced apart from the second gate structure in a top view.

2. The semiconductor device of claim 1, wherein the first and second gate structures have a first pitch, and the second and third gate structures have a second pitch substantially the same as the first pitch.

3. The semiconductor device of claim 1, wherein the first source/drain region has a length in the first direction, and the length of the first source/drain region is greater than a pitch of the first and second gate structures.

4. The semiconductor device of claim 1, further comprising an isolation structure above the substrate and adjacent the first source/drain region, wherein the second gate structure has the first end and a second end, the second gate structure extends from the first end to the second end in the second direction, and the first end of the second gate structure is directly above the isolation structure.

5. The semiconductor device of claim 1, further comprising a second source/drain region between the first and second gate structures.

6. The semiconductor device of claim 5, wherein a length of the second source/drain region is less than a length of the first source/drain region.

7. The semiconductor device of claim 5, wherein a length of the second source/drain region is substantially half of a length of the first source/drain region.

8. The semiconductor device of claim 5, wherein the first and second source/drain regions are arranged in the second direction.

9. A semiconductor device comprising:
   a first semiconductor fin and a second semiconductor fin arranged in a first direction;
   a first gate structure crossing over the first and second semiconductor fins and extending from a first end of the first gate structure to a second end of the first gate structure in the first direction;
   a second gate structure crossing over the second semiconductor fin, spaced apart from the first semiconductor fin, and extending from a third end of the second gate structure to a fourth end of the second gate structure in the first direction, and the first end of the first gate structure is misaligned with the third end of the second gate structure; and
   a first epitaxial structure and a second epitaxial structure above the first semiconductor fin and on opposite sides of the first gate structure, wherein the first and second epitaxial structures have different lengths.

10. The semiconductor device of claim 9, wherein the first epitaxial structure is at the first end of the second gate structure, and the length of the first epitaxial structure is greater than the length of the second epitaxial structure.

11. The semiconductor device of claim 10, wherein the length of the first epitaxial structure is substantially twice the length of the second epitaxial structure.

12. The semiconductor device of claim 9, further comprising a third epitaxial structure and a fourth epitaxial structure above the second semiconductor fin and on opposite sides of the second gate structure.

13. The semiconductor device of claim 12, wherein the third and fourth epitaxial structures have substantially the same length.

14. The semiconductor device of claim 12, wherein the second and third epitaxial structures have substantially the same length.

15. The semiconductor device of claim 12, wherein an edge of the first epitaxial structure is substantially aligned with an edge of the fourth epitaxial structure.

16. The semiconductor device of claim 15, wherein the third epitaxial structure is between the first and second gate structures.

17. A method for manufacturing a semiconductor device, comprising:
   forming an active region above a substrate;
   forming a first gate structure, a second gate structure, a third gate structure above the substrate and crossing over the active region, wherein the first, second and third gate structures have a substantially constant pitch;
   removing a portion of the second gate structure directly between the first and third gate structures to expose a portion of the active region; and
   after removing the portion of the second gate structure, forming a first epitaxial structure at least on the portion of the active region exposed by the second gate structure.

18. The method of claim 17, further comprising forming spacer structures on sidewalls of the first and third gate structures after removing the portion of the second gate structure.

19. The method of claim 17, further comprising forming a recess in the portion of the active region after removing the portion of the second gate structure, wherein the first epitaxial structure is formed in the recess of the portion of the active region.

20. The method of claim 17, further comprising:
   after removing the portion of the second gate structure, removing the first gate structure to expose another portion of the active region; and
   forming a metal gate structure over the another portion of the active region.

* * * * *